United States Patent Office 3,506,683
Patented Apr. 14, 1970

3,506,683
3-(2-PYRROLIDINYLIDENE)-3H-INDOLES
William C. Anthony and Jacob Szmuszkovicz, Kalamazoo, Mich., assignors to The Upjohn Company, Kalamazoo, Mich., a corporation of Delaware
No Drawing. Application Oct. 7, 1963, Ser. No. 314,502, now Patent No. 3,361,759, dated Jan. 2, 1968, which is a continuation-in-part of application Ser. No. 166,926, Jan. 17, 1962. Divided and this application Oct. 17, 1967, Ser. No. 675,770
Int. Cl. C07d 27/00
U.S. Cl. 260—326.15                    6 Claims

ABSTRACT OF THE DISCLOSURE 3-(2-pyrrolidinylidene)-3H-indole free bases and acid addition and quaternary salts thereof are disclosed. The compounds are useful as intermediates in the production of 3-(2-pyrrolidinyl)indoles which compounds are useful antianaphylactic, anti-inflammatory and anorexigenic agents.

CROSS REFERENCE TO RELATED APPLICATIONS

This application is a divisional application of Ser. No. 314,502, filed Oct. 7, 1963 now U.S. Patent No. 3,361,759. Ser. No. 314,502 is a continuation-in-part of application Ser. No. 166,926, filed Jan. 17, 1962, and now abandoned.

BRIEF SUMMARY OF THE INVENTION

This invention relates to novel 3-(2-pyrrolidinylidene)-3H-indole free bases having the formula:

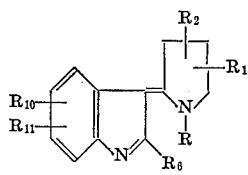

wherein R is selected from the group consisting of alkyl of 1 to 4 carbon atoms, inclusive, benzyl, and p-alkoxybenzyl of 8 to 11 carbon atoms, inclusive; $R_1$, $R_2$ and $R_6$ are selected from the group consisting of hydrogen and alkyl of 1 to 4 carbon atoms, inclusive; and $R_{10}$ and $R_{11}$ are selected from the group consisting of hydrogen, alkyl of 1 to 4 carbon atoms, inclusive, halogen, alkoxy of 1 to 4 carbon atoms, inclusive, benzyloxy, p-alkoxybenzyloxy of 8 to 11 carbon atoms, inclusive, nitro, and amino and acid addition and quaternary ammonium salts thereof.

DETAILS OF THE INVENTION

The novel 3-(2-pyrrolidinylidene)-3H-indole free bases, acid addition and quaternary ammonium salts are useful intermediates in the production of 3-(2-pyrrolidinyl) indole free bases represented by the formula:

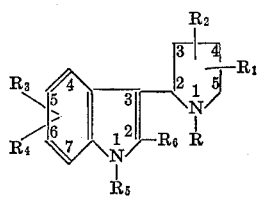

in which formulae $R_1$ and $R_2$ represent hydrogen and alkyl of 1 to 4 carbon atoms, inclusive; $R_3$ and $R_4$ represent hydrogen, alkyl of 1 to 4 carbon atoms, inclusive, halogen, e.g., chloro, bromo, and fluoro, alkoxy of 1 to 4 carbon atoms, inclusive, e.g., methoxy, ethoxy, propoxy, butoxy, and the like, benzyloxy, p-alkoxybenzyloxy of 8 to 11 carbon atoms, inclusive, e.g., p-methoxybenzyloxy, p-ethoxybenzyloxy, p-propoxybenzyloxy, p-butoxybenzyloxy, and the like, hydroxy, nitro, and amino; R represents alkyl of 1 to 4 carbon atoms, inclusive, benzyl, and p-alkoxybenzyl of 8 to 11 carbon atoms, inclusive, with the proviso that when at least one of $R_3$ and $R_4$ is hydroxy, then R represents alkyl; $R_5$ represents hydrogen, benzyl, p-alkoxybenzyl of 8 to 11 carbon atoms, inclusive, and alkyl of 1 to 4 carbon atoms, inclusive, with the proviso that when at least one of $R_3$ and $R_4$ is hydroxy, then $R_5$ only represents hydrogen and alkyl; and $R_6$ represents hydrogen and alkyl of 1 to 4 carbon atoms, inclusive. Representative alkyl radicals of 1 to 4 carbon atoms, inclusive, are, e.g., methyl, ethyl, propyl, butyl, isopropyl, isobutyl and the like. Representative p-alkoxybenzyl radicals of 8 to 11 carbon atoms, inclusive, are, e.g., p-methoxybenzyl, p-ethoxybenzyl, p-propoxybenzyl, p-butoxybenzyl, and the like.

The 3-(2-pyrrolidinyl)indoles can be prepared by the following processes:

(A) 3-(2-pyrrolidinyl)indoles having the formula:

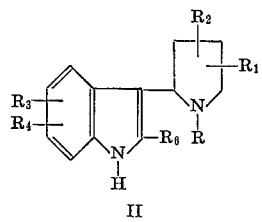

II wherein R, $R_1$, $R_2$, $R_3$, $R_4$, and $R_6$ have the above values, can be prepared by heating a 2-pyrrolidone having the formula:

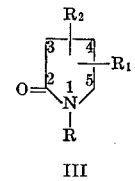

III wherein R, $R_1$, and $R_2$ have the above values, with an indole having the formula:

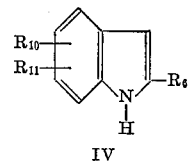

IV wherein $R_6$ has the above value and $R_{10}$ and $R_{11}$ represent the same values as $R_3$ and $R_4$ above with the exclusion of hydroxy, in the presence of phosphorus oxychloride at a temperature between about 50 and about 150° C. for a period between about 1 to about 10 hours to produce a 3-(2-pyrrolidinylidene)-3H-indole having the formula:

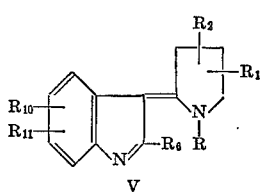

V wherein R, $R_1$, $R_2$, $R_6$, $R_{10}$, and $R_{11}$ have the above values, and reducing the 3-(2-pyrrolidinylidene)-3H-indole with a reducing agent.

The preferred reaction temperature for the preparation of the 3-(2-pyrrolidinylidene)-3H-indoles is within the range of about 80 to about 90° C. Advantageously the reactants are admixed at a temperature of about 20° C. or less, external cooling being applied where necessary; and, when the admixture is complete, the temperature of the reaction mixture is raised to the above-indicated level. Although the reactants can be mixed in any order in the preliminary stage, it is preferred that the phosphorus oxychloride is first added to the 2-pyrrolidone and that to this mixture is then added the starting indole in solution in a further quantity of the 2-pyrrolidone, the temperature being maintained at or below 20° C. throughout the mixing operations.

While the relative molecular proportions of the components of the reaction mixture can vary over a wide range, it is advantageous that the phosphorus oxychloride be employed in an amount which is in excess of that which would represent an equimolar amount with respect to the starting indole. The proportion of 2-pyrrolidone is preferably greatly in excess of that which would represent equimolar proportions with respect to both the phosphorus oxychloride and the indole. The excess of 2-pyrrolidone serves as a convenient solvent medium for the reaction. If desired, however, and especially where the 2-pyrrolidone is a solid, there can also be present in the reaction mixture an inert solvent such as dioxane, tetrahydrofuran, and the like.

Reduction of the 3 - (2 - pyrrolidinylidene) - 3H - indoles can be accomplished by utilizing metal hydrides, such as lithium aluminum hydride, lithium borohydride, sodium borohydride, with sodium borohydride being preferred; or the reduction can be accomplished by catalytic hydrogenation utilizing a noble metal catalyst, e.g., platinum oxide, palladium-black, palladium-charcoal, or the like; or the reduction can be accomplished with an alkali metal (e.g., sodium, lithium or potassium) and a lower alkanol (e.g., methanol, ethanol, propanol or butanol). The reduction with metal hydrides is preferably conducted in an inert solvent, such as tetrahydrofuran, diisopropyl ether, diethyl ether, N-methylmorpholine, dioxane, and the like; in the case of sodium borohydride, the inert solvent can also be a lower alkanol, ethanol being preferred. In many instances, the reduction is conveniently carried out at the boiling point of the solvent used, although other temperatures between about zero and 100° C. can be employed.

The catalytic hydrogenation is usually carried out in the presence of methanol, although other solvents such as ethanol, benzene, or ethyl acetate can also be employed. The reduction is preferably conducted at about 25° C.

For best results, the choice of reducing agent is important in the above process as well as the processes hereinafter disclosed depending on the R, $R_3$, $R_4$, and $R_5$ substituents. When R or $R_5$ is benzyl or p-alkoxybenzyl, the reduction should be carried out with a metal hydride or catalytically with a platinum catalyst, e.g., platinum oxide, in order to avoid debenzylation which results with the use of a palladium catalyst. Similar precautions should be taken when it is desired to produce a 4-, 5-, 6-, and 7-benzyloxy or p-alkoxybenzyloxy substituted compound unless it is desired to produce a 4-, 5-, 6-, or 7-hydroxy substituted compound whereupon the reduction can be carried out with a palladium catalyst.

When a 4-, 5-, 6-, or 7-nitro substituted compound is desired, the reduction should be carried out with sodium borohydride in order to retain the nitro substituents. If it is desired to convert the nitro radical to an amino radical, then reduction can be carried out with lithium aluminum hydride or catalytically. Alternatively, the amino substituted 3-(2-pyrrolidinyl)indoles can be produced by utilizing an amino substituted starting indole (Formula IV; $R_{10}$ or $R_{11}$ is amino).

(B) 3-(2-pyrrolidinyl)indoles having the formula:

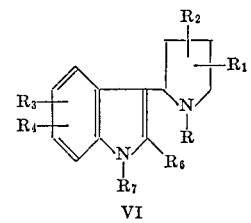

VI wherein R, $R_1$, $R_2$, $R_3$, $R_4$, and $R_6$ have the above values and $R_7$ represents alkyl of 1 to 4 carbon atoms, inclusive, benzyl, or p-alkoxybenzyl of 8 to 11 carbon atoms, inclusive, with the proviso that when at least one of $R_3$ and $R_4$ represents hydroxy, then $R_7$ is alkyl, can be prepared by heating phosphorus oxychloride, a 2-pyrrolidone (Formula III) and an indole having the formula:

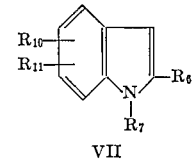

VII wherein $R_6$, $R_7$, $R_{10}$, and $R_{11}$ have the above values, utilizing the same reaction conditions as set forth in Process A, and reducing the resulting product catalytically or with a metal hydride as discussed above.

3-(2-pyrrolidinyl)indoles of Formula VI, wherein $R_7$ is alkyl, benzyl, or p-alkoxybenzyl can also be prepared by the addition of an alkyl, benzyl, or p-alkoxybenzyl radical to 3-(2-pyrrolidinyl)indoles of Formula II, by reaction with an alkyl, benzyl, or p-alkoxybenzyl halide in the presence of an alkaline condensing agent such as alkali-metal amides or alkali-metal hydrides.

(C) 3-(2-pyrrolidinyl)indoles having the formula:

VIII wherein R, $R_1$, $R_2$, $R_5$, and $R_6$ have the above values, and $R_{12}$ and $R_{13}$ represent the same values as $R_3$ and $R_4$ above with the exclusion of nitro, can be prepared by reacting a 3-indolyl 2-aminoethyl ketone having the formula:

IX wherein $R_5$, $R_6$, $R_{10}$, and $R_{11}$ have the above values, and wherein $R_8$ and $R_9$ taken individually represent hydrogen, aryl, aralkyl, and alkyl, and $R_8$ and $R_9$ taken together with —N< also represent a saturated heterocyclic amino radical, with a nitroalkane having the formula:

$$\begin{array}{c} R_2 \\ | \\ HC-NO_2 \\ | \\ R_1 \end{array}$$

X wherein $R_1$ and $R_2$ have the above values, to produce a 3-(4-nitrobutyryl)indole having the formula:

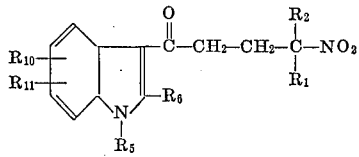

XI wherein $R_1$, $R_2$, $R_5$, $R_6$, $R_{10}$, and $R_{11}$ have the above values, reducing the 3-(4-nitrobutyryl)indole to the corresponding 3-(4-aminobutyryl)indole and cyclizing the latter, utilizing hydrogen and Raney nickel catalyst, to produce a 3-(1-pyrrolin-2-yl)indole having the formula:

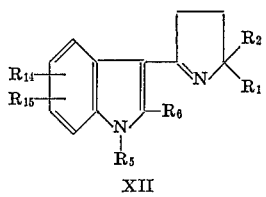

XII wherein $R_1$, $R_2$, $R_5$ and $R_6$ have the above values, and $R_{14}$ and $R_{15}$ represent the same values as $R_3$ and $R_4$ above with the exclusion of nitro and hydroxy, reducing the thus-produced 3-(1-pyrrolin-2-yl)indole with a metal hydride or by catalytic hydrogenation in the presence of a noble metal catalyst as set forth more fully in Process A, above, to produce a 3-(2-pyrrolidinyl)indole having the formula:

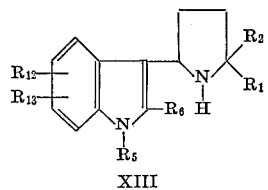

XIII wherein $R_1$, $R_2$, $R_5$, $R_6$, $R_{12}$, and $R_{13}$ have the above values, and alkylating or benzylating the pyrrolidinyl nitrogen of the thus-produced product. The alkylation or benzylation of the pyrrolidinyl nitrogen can be conveniently accomplished by reacting a compound of Formula XIII with an alkyl, benzyl, or p-alkoxybenzyl halide, e.g., methyl iodide, ethyl bromide, isopropyl iodide, butyl iodide, isobutyl bromide, benzyl iodide, benzyl chloride, p-methoxybenzyl chloride, p-ethoxybenzyl iodide, p-butoxybenzyl bromide, p-propoxybenzyl iodide, and the like. Alternatively, the alkylation or benzylation of the pyrrolidinyl nitrogen can be accomplished by reacting a compound of Formula XIII with an alkanoic or a benzoic anhydride to produce a 3-(1-acyl-2-pyrrolidinyl)indole having the formula:

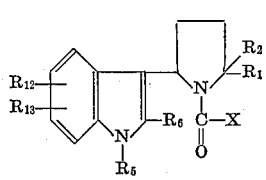

wherein $R_1$, $R_2$, $R_5$, $R_6$, $R_{12}$, and $R_{13}$ have the above values and X represents hydrogen, alkyl of 1 to 3 carbon atoms, inclusive, phenyl, and p-alkoxyphenyl of 7 to 10 carbon atoms, inclusive, and reducing the resulting N-alkanoyl or N-benzoyl compound with a metal hydride, preferably lithium aluminum hydride. Examples of alkanoic and benzoic anhydrides are acetic anhydride, acetic formic anhydride, propionic anhydride, butyric anhydride, benzoic anhydride, p-methoxybenzoic anhydride, p-ethoxybenzoic anhydride, p-propoxybenzoic anhydride, p-butoxybenzoic anhydride, and the like. Additionally, methylation of the pyrrolidinyl nitrogen of a compound of Formula XIII wherein at least one of $R_1$ and $R_2$ is hydrogen, can be accomplished by reacting the said compound with an alkyl formate (e.g., methyl formate, ethyl formate, and the like), and reducing the resulting N-formyl compound with a metal hydride, preferably lithium aluminum hydride.

(D) 3-(2-pyrrolidinyl)indoles of Formula VIII can also be prepared by reducing and concomitantly cyclizing with hydrogen and Raney nickel a 3-(4-nitrobutyryl)indole having the formula:

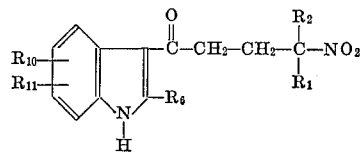

XIV wherein $R_1$, $R_2$, $R_6$, $R_{10}$, and $R_{11}$ have the above values, to produce a 3-(1-pyrrolin-2-yl)indole having the formula:

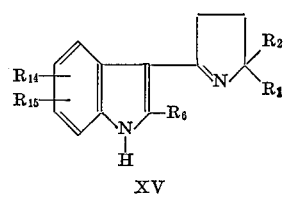

XV wherein $R_1$, $R_2$, $R_6$, $R_{14}$, and $R_{15}$ have the above values, alkylating or benzylating the pyrrolidinyl nitrogen of the resulting cyclized compound with an alkyl, benzyl, or p-alkoxybenzyl halide to obtain a 3-(2-pyrrolidinylidene)-3H-indole, and either (1) reducing the 3-(2-pyrrolidinylidene)-3H-indole with a metal hydride, preferably sodium borohydride, to produce a compound of Formula VIII ($R_5$=hydrogen) or (2) alkylating or benzylating the 3-(2-pyrrolidinylidene)-3H-indole with an alkyl, benzyl, or p-alkoxybenzyl halide to produce a 3 - (2-pyrrolidinylidene)-3H-indole quaternary ammonium salt having the formula:

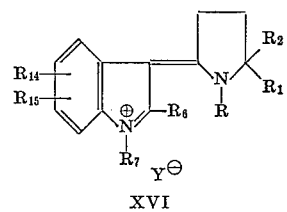

XVI wherein R, $R_1$, $R_2$, $R_6$, $R_7$, $R_{14}$, and $R_{15}$ have the above values and Y is halogen, and reducing the quaternary ammonium salt with a metal hydride, preferably sodium borohydride, to produce a compound of Formula VIII ($R_5$=alkyl, benzyl, or p-alkoxybenzyl).

(E) 3-(2-pyrrolidinyl)indoles having the formula:

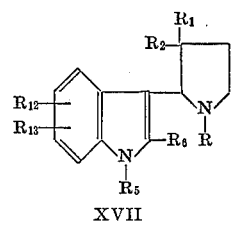

XVII wherein R, $R_1$, $R_2$, $R_5$, $R_6$, $R_{12}$, and $R_{13}$ have the above values, can be prepared by reacting a 3-indolyl 2-aminoethyl ketone quaternary ammonium salt (U.S. Patent 3,037,991) having the formula:

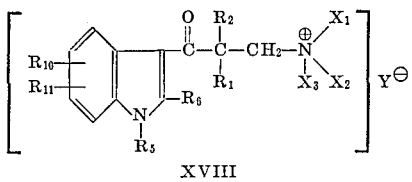

XVIII wherein $R_1$, $R_2$, $R_5$, $R_6$, $R_{10}$, and $R_{11}$ have the above values; $X_1$ and $X_2$, taken individually, represent aryl, aralkyl, and alkyl and together contain not more than fifteen carbon atoms, and when taken together with —N< represent a heterocyclic amino radical such as morpholinyl, piperidyl, pyrrolidyl, thiamorpholinyl, hexamethyleneimino, and the like; $X_3$ represents aralkyl and alkyl and advantageously contains not more than 8 carbon atoms; and Y represents an anion such as a halogen anion, e.g., a chloride, iodide, or bromide, an alkyl sulfate anion, e.g., that derived from dimethyl or diethyl sulfate, a para-toluene-sulfonate anion, e.g., that derived from methyl para-toluene-sulfonate, and the like, with an alkali metal cyanide to produce a 3-(3-cyanoproprionyl) indole having the formula:

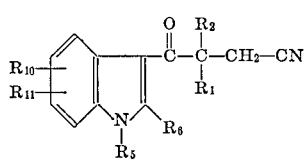

XIX wherein $R_1$, $R_2$, $R_5$, $R_6$, $R_{10}$, and $R_{11}$ have the above values, reducing and cyclizing the 3-(3-cyanopropionyl) indole utilizing hydrogen and Raney nickel catalyst to produce a 3-(1-pyrrolin-2-yl)indole having the formula:

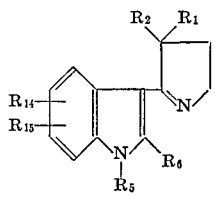

XX wherein $R_1$, $R_2$, $R_5$, $R_6$, $R_{14}$, and $R_{15}$ have the above values, catalytically hydrogenating the 3-(1-pyrrolin-2-yl)indole or reducing with a metal hydride as set forth more fully in Process A, above, to produce a 3-(1-pyrrolidinyl)indole having the formula:

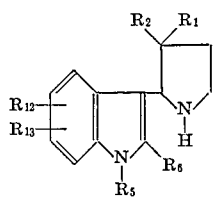

XXI wherein $R_1$, $R_2$, $R_5$, $R_6$, $R_{12}$, and $R_{13}$ have the above values, and alkylating or benzylating the pyrrolidinyl nitrogen.

The alkylation or benzylation of the pyrrolidinyl nitrogen can be accomplished by utilizing an alkyl, benzyl, or p-alkoxybenzyl halide as more fully disclosed in Process C, above.

Alternatively, the alkylation or benzylation can be accomplished by reacting a compound of Formula XXI with an alkanoic or a benzoic anhydride to produce a 3-(1-acyl-2-pyrrolidinyl)indole having the formula:

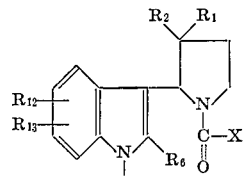

XXII wherein $R_1$, $R_2$, $R_5$, $R_6$, $R_{12}$, $R_{13}$, and X have the above values and reducing the resulting N-alkanoyl or N-benzoyl compound with a metal hydride, preferably lithium aluminum hydride as more fully set forth in Process C.

Alternatively, 3-(1-pyrrolin-2-yl)indoles within the scope of Formula XX and having the formula:

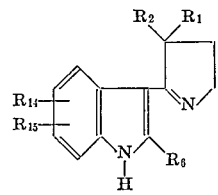

XXIII wherein $R_1$, $R_2$, $R_6$, $R_{14}$, and $R_{15}$ have the above values, can be converted to compounds within the scope of Formula VI by reacting with an alkyl halide, a benzyl halide, or a p-alkoxybenzyl halide to produce a 3-(2-pyrrolidinylidene)-3H-indole acid addition salt having the formula:

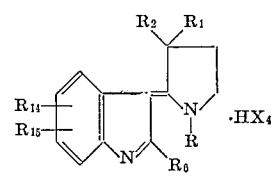

XXIV wherein R, $R_1$, $R_2$, $R_6$, $R_{14}$ and $R_{15}$ have the above values and $X_4$ is halogen, and reducing the acid addition salt with a metal hydride.

(F) 3-(2-pyrrolidinyl)indoles of Formula I can also be prepared by reacting an indole magnesium iodide with a 2-pyrrolidone (Formula III) and reducing with sodium in n-butanol by utilizing the reaction conditions disclosed by Akkerman et al., Rec. Trav. Chim. 73, 629, 1954, for the preparation of the corresponding 3-(2-piperidyl)indoles.

Acid addition salts of the present invention can be prepared from the 3-(2-pyrrolidinyl)indole free bases (Formula I) and 3-(2-pyrrolidinylidene)-3H-indole free bases (Formula V) by conventional methods. For example, the free base can be dissolved in an aqueous solution of the appropriate acid and the salt can be isolated by evaporation of the solution. Alternatively, the free base dissolved in an organic solvent such as methanol, ethanol, isopropanol, ethyl acetate, ether, and the like, can be treated with the appropriate acid and according to the nature of the solvent employed the desired salt will separate spontaneously or can be precipitated by the addition of a solvent in which the salt is insoluble. Suitable acids include hydrochloric, sulfuric, hydriodic, hydrobromic, phosphoric, tartaric, acetic, citric, succinic, lactic, maleic, benzoic, salicyclic, and the like.

3-(2-pyrrolidinyl)indole quaternary ammonium salts can be prepared by reacting 3-(2-pyrrolidinyl)indole free bases in an inert solvent with a quaternary ammonium salt-forming compound such as methyl iodide, ethyl bromide, octyl bromide, benzyl chloride, dimethyl sulfate, methyl para-toluenesulfonate, and the like.

The 3-(2-pyrrolidinyl)indole N-oxides can be prepared by reacting 3-(2-pyrrolidinyl)indole free bases with an oxidizing agent such as hydrogen peroxide, peracetic acid, m-chloroperbenzoic acid, and the like.

Starting indoles utilized in the above-outlined processes can be prepared by known procedures. Such methods, including the well-known Fischer synthesis, are summarized in "Chemistry of Carbon Compounds," edited by E. H. Rodd, Vol. IVA, pages 71–77, Elsevier, New York, 1957; and "Heterocyclic Compounds," Elderfield, vol. 3, 1952, John Wiley and Sons, Inc. Representative starting indoles include indole, 1-ethylindole, 7-ethylindole, 1-methylindole, 4-, 5-, 6- and 7-methylindoles, 5-ethylindole, 6-butylindole, 5-isobutylindole, 1,4-dimethylindole, 4,6-dimethylindole, 1,7-dimethylindole, 1,7-dipropylindole, 1,5-dipropylindole, 1,6-dibutylindole, 1-benzylindole, 4,5-dipropylindole, 5,7-dimethylindole, 4,6-diethylindole, 1-propyl-6-ethylindole, 1-benzyl-5-methylindole, 1-benzyl-5-ethylindole, 4-methyl-7-isopropylindole, 1-butyl-4-methyl-7-isopropylindole, 5-chloroindole, 5-bromoindole, 5-methoxyindole, 5-fluoroindole, 5-benzyloxyindole, 6-benzyloxyindole, 2-methylindole, 1-methyl-5-ethoxyindole, 1-methyl-5-methoxyindole, 2-methyl-5,7-dichloroindole, 5,6-dimethoxyindole, 2-ethylindole, 1-ethyl-2-methylindole, 2-t-butylindole, 2-propylindole, 2,4,7-trimethylindole, 6-aminoindole, 1-methyl-5,6-dimethoxyindole, 2-methyl-5,6-dimethoxyindole, 2-methyl-5-fluoroindole, 2-methyl-5-methoxyindole, 2-methyl-5-chloroindole, 2-methyl-7-nitroindole, 2-methyl-5-benzyloxyindole, 2-propyl-5-benzyloxyindole and the like.

The starting 2-pyrrolidones can be prepared by reacting an alkylamine with a gamma-butyrolactone as disclosed by Adams et al., J. Amer. Chem. Soc. 63, 228, 1941. An alternative procedure involves reacting a 2-pyrrolidone, unsubstituted in the 1-position, with an alkyl halide in the presence of an alkaline condensing agent such as alkali-metal amides, alkali-metal hydrides, or alkali-metal alkoxides. Representative 2-pyrrolidones which can be prepared by the above procedures and utilized herein include 1-methyl-2-pyrrolidone,
1-butyl-2-pyrrolidone,
1,3-dimethyl-2-pyrrolidone,
1,4-dimethyl-2-pyrrolidone,
1,5-dimethyl-2-pyrrolidone,
1-methyl-5-ethyl-2-pyrrolidone,
1-ethyl-2-pyrrolidone,
1-propyl-2-pyrrolidone,
1-butyl-3-propyl-2-pyrrolidone,
1,3-diethyl-2-pyrrolidone,
1,4-diethyl-2-pyrrolidone,
1-dipropyl-2-pyrrolidone,
1,5-dibutyl-2-pyrrolidone,
1,3,5-trimethyl-2-pyrrolidone,
1,4,5-trimethyl-2-pyrrolidone,
1,3,3-trimethyl-2-pyrrolidone,
1,5,5-trimethyl-2-pyrrolidone,
1-ethyl-3-propyl-2-pyrrolidone,
1-ethyl-4-propyl-2-pyrrolidone,
1-propyl-4-isopropyl-2-pyrrolidone,
1,3,3-triethyl-2-pyrrolidone,
1,3,4-triethyl-2-pyrrolidone,
1,4-diethyl-3-methyl-2-pyrrolidone,
1,4-diethyl-4-methyl-2-pyrrolidone,
1-ethyl-5-methyl-2-pyrrolidone,
1-methyl-4,4-diethyl-2-pyrrolidone,
1-butyl-3,3-diethyl-2-pyrrolidone,
1-ethyl-4-methyl-2-pyrrolidone,
1-methyl-5-butyl-2-pyrrolidone,
1-methyl-5-ethyl-2-pyrrolidone, and the like.

The 3-indolyl 2-aminoethyl ketones utilized in Process C can be prepared by the process set forth in J. Amer. Chem. Soc. 82, 1180, 1960.

The following examples are illustrative of the products and processes of the present invention but are not to be construed as limiting.

EXAMPLE 1.—3-(1-METHYL-2-PYRROLIDINYL) INDOLE FREE BASE (A) 3-(1-methyl-2-pyrrolidinylidene)-3H-indole Phosphorus oxychloride (40.8 g.; 0.26 mole) was added to 40 ml. (0.4 mole) of 1-methyl-2-pyrrolidone at such a rate that the temperature of the mixture did not exceed 15° C. The mixture was stirred for 20 minutes and a solution of 28.0 g. (0.24 mole) of indole and 40 ml. (0.4 mole) of 1-methyl-2-pyrrolidone was slowly added. The resulting mixture was then carefully heated to 35° C. The mixture was quickly immersed in an ice bath when the temperature began to rise. The temperature rose to 130° C. When the temperature dropped to 70° C., the mixture was heated at 80° C. for two hours, cooled and mixed with ice water. When the solution was clear, 42.0 g. of sodium hydroxide was added. The mixture was filtered and the solid material was washed with water. The solid was dissolved in 200 ml. of ethanol, the mixture was filtered, and the filtrate was diluted at its boiling point with 300 ml. of water. After cooling for 1 hour, 41.6 g. (89% yield) of 3-(1-methyl-2-pyrrolidinylidene)-3H-indole was obtained, which product melted between 229–231° C.

Analysis.—Calcd. for $C_{13}H_{14}N_2$ (percent): C, 78.75; H, 7.12; N, 14.13. Found (percent): C, 78.35; H, 7.18; N, 14.43.

(B) 3-(1-methyl-2-pyrrolidinyl)indole free base 9.8 g. (0.05 mole) of 3-(1-methyl-2-pyrrolidinylidene)-3H-indole was added to a refluxing mixture of 4.5 g. (0.12 mole) of lithium aluminum hydride and 150 ml. of tetrahydrofuran. The mixture was refluxed for 6 hours, cooled, decomposed with water in tetrahydrofuran, followed by approximately 10 ml. of concentrated sodium hydroxide solution. Ether was added and the mixture was filtered. The solid was washed with ether. The filttrates were combined, dried over anhydrous potassium carbonate, filtered and concentrated. The oily residue was recrystallized from Skellysolve B (Skellysolve B is essentially a mixture of hexanes having a boiling range of 140–160° F.) to yield 7.5 g. (75% yield) of 3-(1-methyl-2-pyrrolidinyl)indole free base which melted between 95–97° C.

Analysis.—Calcd. for $C_{13}H_{16}N_2$ (percent): C, 77.96; H, 8.05; N, 13.99. Found (percent): C, 77.58; H, 8.31; N, 13.89.

A mixture of 4.8 g. (0.025 mole) of 3-(1-methyl-2-pyrrolidinylidene)-3H-indole, 100 ml. of absolute methanol, and 0.2 g. of platinum oxide was shaken with hydrogen at 50 pounds initial pressure for 20 hours. The mixture was filtered and the filtrate was concentrated to dryness. The residue was dissolved in boiling Skellysolve B and filtered through glass wool. The solution was put in an ice bath for 30 minutes and the resulting crystals were recovered by filtration, to yield 4.1 g. (80% yield) of 3-(1-methyl-2-pyrrolidinyl)indole free base.

EXAMPLE 2.—1-METHYL-3-(1-METHYL-2-PYRROLIDINYL)INDOLE (A) 1-methyl-3-(1-methyl-2-pyrrolidinyl)indole free base A solution of 3-(1-methyl-2-pyrrolidinyl)indole (25 g.; 0.125 mole) in 100 ml. of ether was added with stirring during 20 min. to a suspension of sodium amide (0.128 mole) in 475 ml. of liquid ammonia. Methyl iodide (18.0 g.; 0.128 mole) was then added during 30 min. The mixture was stirred for 30 min. Ammonia was then allowed to evaporate, 100 ml. of water was added, and the mixture was extracted with ether. The extracts were washed with saturated salt solution, dried over sodium sulfate, and evaporated to give an oil (20 g.). Distillation of this oil (19 g.) at 0.01 mm. afforded 12.52 g. of 1-methyl-3-(1-methyl-2- pyrrolidinyl) indole free base (49% yield), with a boiling point of 113° C. The oil crystallized on standing in the cold for a few days and melted between 45.5–47.5° C.

*Analysis.*—Calcd. for $C_{14}H_{18}N_2$ (percent): C, 78.46; H, 8.47; N, 13.07. Found (percent): C, 77.96; H, 8.98; N, 13.05.

(B) *1-methyl-3-(1-methyl-2-pyrrolidinyl)indole picrate*

1-methyl-3-(1-methyl - 2 - pyrrolidinyl)indole free base (0.119 g.; 0.56 millimole) in 10 ml. of ethanol was treated with 7.6 ml. of saturated ethanolic picric acid solution. Crystallization commenced after a few seconds; 0.217 g. of 1-methyl-3-(1-methyl-2-pyrrolidinyl)indole picrate melting between 196–196.5° C. was obtained. On recrystallization from ethanol the compound melted between 196.5–197° C.

*Analysis.*—Calcd. for $C_{20}H_{21}N_5O_7$ (percent): C, 54.17; H, 4.77; N, 15.80. Found (percent): C, 53.93; H, 4.41; N, 15.85.

EXAMPLE 3.—3-(1,5-DIMETHYL-2-PYRROLI-DINYL)INDOLE BASE (A) *3-(4-nitrovaleryl)indole*

A mixture of 3-dimethylamino-1-(3-indolyl)-1-propanone (21.6 g.; 0.1 mole), 100 ml. of nitroethane, and sodium methoxide (0.54 g.; 0.01 mole) was stirred and refluxed for 6 hours while a slow stream of nitrogen was passed through the suspension. After standing for 12 hours the mixture was filtered. The solid thus obtained was washed with ether and then with water. The washed solid was crystallized from isopropyl alcohol. The product, 3-(4-nitrovaleryl)indole, weighed 11.61 g. (47% yield) and melted between 155–156° C.

*Analysis.*—Calcd. for $C_{13}H_{14}N_2O_3$ (percent): C, 63.40; H, 5.73; N, 11.38. Found (percent): C, 63.42; H. 5.64; N, 10.98.

(B) *3-(5-methyl-1-pyrrolin-2-yl)indole*

A solution of 3-(4-nitrovaleryl)indole (36.9 g.; 0.15 mole) in 300 ml. of absolute ethanol was hydrogenated at 50 lbs. (initial pressure of hydrogen) in the presence of 2 teaspoons of Raney nickel catalyst. The theoretical amount of hydrogen was absorbed in 18 hours. The mixture was filtered and evaporated. The residue was recrystallized from isopropyl alcohol. The recrystallized product, 3-(5-methyl-1-pyrrolin-2-yl)indole, weighed 16.1 g. and melted between 196–197° C. and a second crop of 6.8 g. melted between 194–196° C. The total yield was 77% of theoretical.

Ultraviolet spectrum (ethanol) showed $\lambda_{max}$. 218 (25,300); sh. 238; 256 (11,750); 271 (9,800); 291 (11,900); sh. 301.5; sh. 320 (2,750); sh. 332 (2,200).

*Analysis.*—Calcd. for $C_{13}H_{14}H_2$ (percent): C, 78.75; H, 7.12; N, 14.13. Found (percent): C, 78.77; H, 6.90; N, 14.41.

(C) *3-(5-methyl-2-pyrrolidinyl)indole hydrochloride*

A solution of 9.4 g. of 3-(5-methyl-1-pyrrolin-2-yl)indole in 300 ml. of ethanol was hydrogenated in the presence of platinum oxide catalyst (0.5 g.) at initial pressure of 50 lbs. After the theoretical amount of hydrogen had been absorbed, the mixture was filtered and the resulting solution was evaporated to about 25 ml. and acidified with ethereal hydrogen chloride. Ether was then added until crystallization began. Three recrystallizations of the resulting solid from methanol produced 9.1 g. (81.4% yield) of 3-(5-methyl-2-pyrrolidinyl)indole hydrochloride which melted between 225–226° C.

*Analysis.*—Calcd. for $C_{13}H_{17}ClN_2$ (percent): C, 65.95; H, 7.24; N, 11.84. Cl. 14.97. Found (percent): C, 65.94; H, 7.10; N, 11.70; Cl, 14.94.

(D) *3-(1,5-dimethyl-2-pyrrolidinyl)indole free base*

(1) *By lithium aluminum hydride reduction.*—1.2 g. (0.005 mole) of 3-(5-methyl-2-pyrrolidinyl)indole hydrochloride was dissolved in 10 ml. of water. The solution was basified with 15% aqueous sodium hydroxide solution and extracted with ether. The extracts were washed with saturated salt solution, dried over anhydrous sodium sulfate, and evaporated to give 1 g. of 3-(5-methyl-2-pyrrolidinyl)indole free base as a yellow oil. Methyl formate (50 ml.) was added to the oil. The solution was refluxed for 93 hours and then evaporated to dryness to give 3-(1-formyl-5-methyl-2-pyrrolidinyl)indole as an amorphous solid. The solid was dissolved in benzene, the solution was dried by distillation, and was added to a solution of lithium aluminum hydride (1.2 g.) in 100 ml. of ether. After refluxing for 18 hours, the mixture was decomposed in succession with 1.2 ml. of water, 1.2 ml. of 15% aqueous sodium hydroxide solution, and 3.6 ml. of water. The suspension was filtered, the solid was washed with ether, and the filtrate was evaporated to give 1.11 g. of oily crystals. Three recrystallizations from ether-Skellysolve B produced 0.182 g. (17% yield) of 3-(1,5-dimethyl-2-pyrrolidinyl)indole free base with a melting point between 145–148° C.

(2) *By sodium borohydride reduction.*—A solution of 3-(5-methyl-1-pyrrolin-2-yl)indole (1.98 g.; 0.01 mole) in 15 ml. of methanol and 5 ml. of methyl iodide was refluxed for 3 hours. The solution was then evaporated to dryness and the resulting solid, 3-(1,5-dimethyl-2-pyrrolidinylidene)-3H-indole hydroiodide, crystallized from methanol-ether; 1.7 g., M.P. 224–227° C. Two crystallizations raised the M.P. to 237–239.5° C.

Ultraviolet spectrum (ethanol) showed $\lambda_{max}$. sh. 246 (11,200); 251 (13,500); 265 (10,050); 271 (10,400); 332 (18,700).

*Analysis.*—Calcd. for $C_{14}H_{17}IN_2$ (percent): C, 49.42; H, 5.04; I, 37.30; N, 8.24. Found (percent): C, 49.49; H, 4.98; I, 37.11; N, 8.62.

Sodium borohydride (1.3 g.) was added to a suspension of 3-(1,5-dimethyl-2-pyrrolidinylidene)-3H-indole hydroiodide (1.3 g.; 3.83 millimoles) in 100 ml. of ethanol. The mixture was stirred for 4 hours and then evaporated to dryness. Water (100 ml.) and 20% aqueous sodium hydroxide solution (10 ml.) was added and the mixture was extracted with ether. The extract was washed with water, dried with sodium sulfate, and evaporated to give 0.8 g. of crude product. Two crystallizations from methanol-ether afforded colorless prisms of 3-(1,5-dimethyl-2-pyrrolidinyl)indole free bore, M.P. 151–152° C.

Ultraviolet spectrum (ethanol) showed $\lambda_{max}$. 217 (37,750); sh. 274 (5,950); 280 (6,350); 289 (5,250).

*Analysis.*—Calcd. for $C_{14}H_{18}N_2$ (percent): C, 78.46; H, 8.47; N, 13.07. Found (percent): C, 78.36; H, 8.45; N, 13.07.

Ultraviolet and infrared spectra showed this compound to be identical with that obtained above by reducing 3-(1-formyl-5-methyl-2-pyrrolidinyl)indole with lithium aluminum hydride.

EXAMPLE 4.—5-METHYL-3(1-METHYL-2-PYRROLIDINYL)INDOLE FREE BASE (A) *5-methyl-3-(1-methyl-2-pyrrolidinylidene) 3H-indole*

Phosphorus oxychloride (40.8 g.; 0.26 mole) was added with stirring over a period of 30 minutes to 40 ml. (0.4 mole) of 1-methyl-2-pyrrolidone cooled in an ice bath. The temperature was not permitted to exceed 15° C. The thick yellow paste was stirred while cooling in the ice bath for an additional 20 minutes. To the mixture was added with stirring during 15 minutes a solution of 10.1 g. (0.77 mole) of 5-methylindole in 40 ml. (0.4 mole) of 1-methyl-2-pyrrolidone. The temperature did not rise above 8° C. The ice bath was removed. In sixteen minutes a maximum temperature of 49° C. was reached and a solid precipitated. The mixture was heated at 80° C. for 2 hours. After cooling, the mixture was dissolved in 500 ml. of water. The solution was made basic by the addition of a solution of 60 g. of sodium hydroxide in 300 ml. of water. The resulting paste was filtered and the solid was washed with 300 ml. of water and then dissolved in 250 ml. of ethanol. The volume was reduced to 125 ml. and 60 ml. of water was added while the solution was kept boiling. The solution was cooled to produce 15.3 g. (93.5% yield) of 5-methyl-3-(1-methyl-2-pyrrolidinylidene)-3H-indole which sintered at 202° C. and melted between 209–212° C. (dec.).

Analysis.—Calcd. for $C_{14}H_{16}N_2$ (percent): C, 79.21; H, 7.60; N, 13.20. Found (percent): C, 78.87; H, 7.64; N, 12.94.

(B) *5-methyl-3-(1-methyl-2-pyrrolidinyl)indole free base*

A mixture of 12.7 g. of 5-methyl-3-(1-methyl-2-pyrrolidinylidene)-3H-indole, 150 ml. of methanol, and 0.2 g. of platinum oxide catalyst was shaken on a Parr hydrogenation apparatus at 50 lbs. initial pressure of hydrogen. After 10 minutes one equivalent of hydrogen was absorbed. An additional 4½ hours of shaking resulted in no additional uptake of hydrogen. The catalyst was removed by filtration and the solvent was removed under reduced pressure on the steam bath. The residual yellow viscous oil was crystallized from Skellysolve B, giving 11.5 g. (91.5% yield) of 5-methyl-3-(1-methyl-2-pyrrolidinyl)indole free base which sintered at 114° C. and melted between 116–117.5° C. Recrystallization from ether-Skellysolve B produced colorless prisms, sintering at 115° C. and melting between 116.5–117.5° C.

Analysis.—Calcd. for $C_{14}H_{18}N_2$ (percent): C, 78.46; H, 8.46; N, 13.08. Found (percent): C, 78.73; H, 8.54; N, 12.34.

EXAMPLE 5.—1-BENZYL-3-(1-METHYL-2-PYRROLIDINYL)INDOLE (A) *1-benzyl-3-(1-methyl-2-pyrrolidinyl)indole free base*

Phosphorus oxychloride (40.8 g.; 0.26 mole) was added with stirring to 60 ml. (0.6 mole) of 1-methyl-2-pyrrolidone cooled in an ice bath at such a rate (25 minutes) that the temperature of the reaction mixture did not exceed 15° C. The yellow paste was stirred an additional 25 minutes while cooling in the ice bath. To this material was added with stirring a solution of 49.7 g. (0.24 mole) of 1-benzylindole in 100 ml. (1 mole) of 1-methyl-2-pyrrolidone at such a rate (30 minutes) that the temperature of the reaction mixture did not exceed 15° C. The ice bath was removed and after standing 1½ hours the orange solution was heated at 90° C. for 2 hours. The solution was cooled and treated with 750 ml. of water. The mixture was then made basic by the addition of a solution of 60 g. of sodium hydroxide in 300 ml. of water and extracted with three 600-ml. portions of ether. The combined ether extracts were washed with three 200-ml. portions of water and dried over anhydrous magnesium sulfate. The ether was evaporated on the steam bath, yielding 58.7 g. of light brown oil which darkened on standing.

A mixture of 20 g. of the brown oil, 400 ml. of absolute ethanol, and 20 g. of sodium borohydride was allowed to stand at 25° C. for 2 days. The solvent was removed under reduced pressure on the steam bath. The residue was treated with 250 ml. of water. The mixture was extracted with two 400-ml. portions of ether. The combined ether extracts were washed with two 100-ml. portions of water and dried over anhydrous magnesium sulfate. The ether was evaporated and the residue was distilled at 0.05 mm. The product was 1-benzyl-3-(1-methyl-2-pyrrolidinyl) indole free base and had a boiling point of 180–185° C. at 0.05 mm.

Analysis.—Calcd. for $C_{20}H_{22}N_2$ (percent): C, 82.71; H, 7.64; N, 9.65. Found (percent): C, 82.00; H, 7.16; N, 9.39.

In the manner as shown above, 5-methyl-1-(p-methoxybenzyl)-3-(1-methyl-2-pyrrolidinylindole free base, 1-(p-ethoxybenzyl) - 2 - methyl-3-(1-methyl-2-pyrrolidinyl)indole free base, 1-(p-propoxybenzyl)-3-(1-methyl-2-pyrrolidinylindole free base, and 1 - (p-butoxybenzyl)-3-(1-methyl-2-pyrrolidinyl)indole free base were prepared by substituting 5-methyl - 1 - (p-methoxybenzyl)indole, 1-(p-ethoxybenzyl) - 2 - methylindole, 1-(p-propoxybenzyl)indole, and 1-(p-butoxybenzyl)indole, respectively, for 1-benzylindole.

(B) *1-benzyl-3-(1-methyl-2-pyrrolidinyl)indole cyclohexanesulfamate*

6.3 g. (0.0216 mole) of 1-benzyl-3-(1-methyl-2-pyrrolidinyl)indole free base was dissolved in 20 ml. of isopropyl alcohol and added to 3.88 g. (0.0216 mole) of cyclohexanesulfamic acid dissolved in 20 ml. of isopropyl alcohol. Anhydrous ether was added until the solution became cloudy. Cooling for 12 hours produced an oily solid. The solvent was decanted whereupon the oil soon solidified. The solid was crystallized from isopropyl alcohol-ether, giving 6.5 g. of 1-benzyl-3-(1-methyl-2-pyrrolidinyl)indole cyclohexanesulfamate which melted between 127–129.5° C.

Analysis. — Calcd. for $C_{26}H_{35}N_3O_3S$ (percent): C, 66.48; H, 7.51; N, 8.95. Found (percent): C, 66.48; H, 7.31; N, 8.91.

EXAMPLE 6.—7-METHYL-3-(1-METHYL-2-PYRROLIDINYL)INDOLE FREE BASE (A) *7-methyl-3-(1-methyl-2-pyrrolidinylidene)-3H-indole*

Phorphorus oxychloride (81.6 g.; 0.52 mole) was added with stirring over a period of 50 minutes to 100 ml. (1 mole) of 1-methyl-2-pyrrolidone cooled in an ice bath. The temperature of the reaction mixture did not exceed 15° C. The yellow paste was stirred an additional 10 minutes while cooling in the ice bath. To this mixture was then added with stirring a solution of 52.5 g. (0.4 mole) of 7-methylindole in 100 ml. (1 mole) of 1-methyl-2-pyrrolidone during 20 minutes. The temperature did not rise above 15° C. The ice bath was removed and in 7 minutes the temperature rose to 64° C. The ice bath was replaced. When the temperature of the reaction mixture fell to 50° C., the ice bath was again removed. The mixture was then heated at 85° C. for 2 hours, cooled, and treated with 1000 ml. of water. The resulting brown solution was basified by the addition of a solution of 120 g. of sodium hydroxide in 600 ml. of water. The resulting thick paste was diluted with 1000 ml. of water and filtered. The recovered solid was washed well with water and recrystallized from aqueous methanol, giving 79 g. (93% yield) of 7 - methyl - 3 - (1-methyl-2-pyrrolidinylidene)-3H-indole which sintered at 202° C. and melted between 208–210° C. (decomp.). After four recrystallizations from aqueous methanol the compound sintered at 205° C. and melted between 210–212° C. (dec.).

Analysis.—Calcd. for $C_{14}H_{16}N_2$ (percent): C, 79.21; H, 7.60; N, 13.20. Found (percent): C, 79.37; H, 7.54; N, 13.01.

(B) *7-methyl-3-(1-methyl-2-pyrrolidinyl)indole free base*

A mixture of 40 g. of 7-methyl-3-(1-methyl-2-pyrrolidinylidene)-3H-indole, 19 g. of sodium borohydride, and 500 ml. of absolute ethanol was allowed to stand for 12 hours at 25° C. The solvent was removed under reduced pressure on the steam bath. The residue was treated with 300 ml. of water and an oil separated. The mixture was extracted with two 400-ml. portions of ether. The combined ether extracts were washed with two 100-ml. portions of water and dried over anhydrous magnesium sulfate. The ether was evaporated and the residue was crystallized from ether-Skellysolve B, giving a pale yellow solid. The solid was recrystallized from ether-Skellysolve B, giving 29 g. (72% yield) of 7-methyl-3-(1-methyl-2-pyrrolidinyl)indole free base which melted between 93–97° C. On another recrystallization from ether-Skellysolve B, the compound melted between 95–97.5° C.

Analysis.—Calcd. for $C_{14}H_{18}N_2$ (percent): C, 78.46; H, 8.46; N, 13.08. Found (percent): C, 78.69; H, 8.58; N, 12.89.

EXAMPLE 7.—3-(1-METHYL-5-ETHYL-2-PYR-ROLIDINYL)INDOLE FREE BASE

(A) 3-(4-nitrohexanoyl)indole

In the same manner as shown in Example 3, Part A, 3-(4-nitrohexanoyl)indole was prepared by substituting 1-nitropropane for nitroethane. The compound melted between 171–173° C.

(B) 3-(5-ethyl-1-pyrrolin-2-yl)indole

In the same manner as shown in Example 3, Part B, 3-(5-ethyl-1-pyrrolin-2-yl)indole was prepared by substituting 3-(4-nitrohexanol)indole for 3-(4-nitrovaleryl)indole.

(C) 3-(5-ethyl-2-pyrrolidinyl)indole hydrochloride

In the same manner as shown in Example 3, Part C, 3-(5-ethyl-2-pyrrolidinyl)indole hydrochloride was prepared by starting with 3-(5-ethyl-1-pyrrolin-2-yl)indole instead of 3-(5-methyl-1-pyrrolin-2-yl)indole. The product melted between 227–228° C.

*Analysis.*—Calcd. for $C_{14}H_{19}ClN_2$ (percent): C, 67.05; H, 7.64; Cl, 14.14; N, 11.17. Found (percent): C, 66.86; H, 7.24; Cl, 14.31; N, 11.42.

(D) 3-(1-methyl-5-ethyl-2-pyrrolidinyl)indole free base (1) *By lithium aluminum hydride reduction.*—The 3-(5-ethyl-2-pyrrolidinyl)indole hydrochloride of Part C was dissolved in water and basified with 15% aqueous sodium hydroxide solution and extracted with ether. The extracts were washed with saturated salt solution, dried over anhydrous sodium sulfate, and evaporated to give 3-(5-ethyl-2-pyrrolidinyl)indole free base. A mixture of 3-(5-ethyl-2-pyrrolidinyl)indole free base (0.5 g.; 2.33 millimoles) and 25 ml. of methyl formate was refluxed for 70 hours. The resulting solution was evaporated to dryness to give an oil which showed a strong amide band at 1650 cm.$^{-1}$ in the infrared spectrum. A solution of this oil in 25 ml. of benzene was added to a solution of lithium aluminum hydride (0.55 g.) in 50 ml. of ether, and the mixture was refluxed for 18 hours. It was then decomposed in succession with 0.5 ml. of water, 0.5 ml. of 15% aqueous sodium hydroxide solution, and 1.5 ml. of water. The suspension was stirred for 1 hour and filtered. The filtrate was evaporated to dryness and the resulting solid (0.5 g.) was crystallized from ether-petroleum ether B.P. (30–60° C.) to give 0.42 g. (79% yield) of 3-(1-methyl-5-ethyl-2-pyrrolidinyl)indole free base which melted between 140–141° C.

(2) *By sodium borohydride reduction.*—A solution of 3-(5-ethyl-1-pyrrolin-2-yl)indole (Part B) (2.12 g.; 0.01 mole) in 15 ml. of methanol and 5 ml. of methyl iodide was refluxed for 4 hours under nitrogen. The mixture was allowed to stand for 12 hours and then evaporated to dryness under reduced pressure. Crystallization from methanol-ether afforded 1.2 g. of colorless needles of 3-(1-methyl-5-ethyl-2-pyrrolidinylidene)3H-indole hydroiodide, M.P. 157–164° C. Recrystallization raised the M.P. to 167.5–169° C. (1.0 g.; 28% yield).

Ultraviolet spectrum (ethanol) showed $\lambda_{max}$. sh. 246; 251 (12,850); 265 (10,100); 270 (10,550); 332 (19,250).

*Analysis.*—Calcd. for $C_{15}H_{19}IN_2$ (percent): C, 50.86; H, 5.40; I, 35.83; N, 7.91. Found (percent): C, 50.80; H, 4.99; I, 35.84; N, 7.79.

Sodium borohydride (2.4 g.) was added during 5 minutes to a solution of 3-(1-methyl-5-ethyl-2-pyrrolidinylidene)-3H-indole hydroiodide (2.4 g.; 6.8 millimoles) in 100 ml. of ethanol. The mixture was stirred for 4 hours and then evaporated to dryness. The residue was treated with 100 ml. of water and extracted with ether (three 200-ml. portions). The combined ether extracts were washed with saturated salt solution, dried with sodium sulfate, and evaporated to give 2.0 g. of a colorless solid. Crystallization from ether-petroleum ether (B.P. 30–60° C.) gave 1.0 g. (65% yield) of 3-(1-methyl-5-methyl-2-pyrrolidinyl)indole free base, M.P. 139–140° C., raised on recrystallization to 140–141° C.

Ultraviolet spectrum (ethanol) showed $\lambda_{max}$. 219.5 (34,750); sh. 274 (5,650); 281 (6,100); 289 (5,000).

*Analysis.*—Calcd. for $C_{15}H_{20}N_2$ (percent): C, 78.90; H, 8.83; N, 12.27. Found (percent): C, 78.60; H, 8.75; N, 12.45.

Ultraviolet and infrared spectra showed this compound to be identical with that obtained by the lithium aluminum hydride procedure above.

EXAMPLE 8.—1-ETHYL-3-(1-ETHYL-2-PYRROLIDINYL)INDOLE

In the same manner as disclosed in Example 5A, 1-ethyl-3-(1-ethyl-2-pyrrolidinyl)indole free base was prepared by substituting 1-ethyl-2-pyrrolidone and 1-ethylindole for 1-methyl-2-pyrrolidone and 1-benzylindole.

In the same manner as shown in Example 5B, 1-ethyl-3-(1-ethyl-2-pyrrolidinyl)indole hydrochloride was prepared by substituting hydrogen chloride and 1-ethyl-3-(1-ethyl-2-pyrrolidinyl) indole free base for cyclohexanesulfamic acid and 1-benzyl-3-(1-methyl-2-pyrrolidinyl)indole free base.

EXAMPLE 9.—4,6-DIMETHYL-3-(1-PROPYL-2-PYRROLIDINYL)INDOLE

In the same manner as shown in Example 6, 4,6-dimethyl-3-(1-propyl-2-pyrrolidinyl)indole free base was prepared by substituting 4,6-dimethylindole and 1-propyl-2-pyrrolidone for 7-methylindole and 1-methyl-2-pyrrolidone to produce 4,6-dimethyl-3-(1-propyl-2-pyrrolidinylidene)-3H-indole and reducing the latter with sodium borohydride.

In the same manner as shown in Example 5B, 4,6-dimethyl-3-(1-propyl-2-pyrrolidinyl)indole sulfate was prepared by substituting 4,6-dimethyl-3-(1-propyl-2-pyrrolidinyl)indole free base and sulfuric acid for 1-benzyl-3-(1-methyl-2-pyrrolidinyl)indole free base and cyclohexanesulfamic acid.

EXAMPLE 10.—5,7-DIMETHYL-3-(1-BUTYL-2-PYRROLIDINYL)INDOLE FREE BASE

In the same manner as shown in Example 6, 5,7-dimethyl-3-(1-butyl-2-pyrrolidinyl)indole free base was prepared by substituting 5,7-dimethylindole and 1-butyl-2-pyrrolidone for 7-methylindole and 1-methyl-2- pyrrolidone to produce 5,7-dimethyl-3-(1-butyl-2-pyrrolidinylidene)-3H-indole and reducing the latter with sodium borohydride.

EXAMPLE 11.—1,7-DIMETHYL-3-(1,3-DIMETHYL-2-PYRROLIDINYL)INDOLE

In the same manner as shown in Example 5A, 1,7-dimethyl-3-(1,3-dimethyl-2-pyrrolidinyl)indole free base was prepared by substituting 1,7-dimethylindole and 1,3-dimethyl-2-pyrrolidone for 1-benzylindole and 1-methyl-2-pyrrolidone.

In the same manner as shown in Example 5B, 1,7-dimethyl-3-(1,3-dimethyl-2-pyrrolidinyl)indole citrate was prepared by substituting citric acid and 1,7-dimethyl-3-(1,3-dimethyl-2-pyrrolidinyl)indole free base for cyclohexanesulfamic acid and 1-benzyl-3-(1-methyl-2-pyrrolidinyl)indole free base.

EXAMPLE 12.—7-ETHYL-3-(1,5-DIMETHYL-2-PYRROLIDINYL)INDOLE FREE BASE

In the same manner as shown in Example 6, 7-ethyl-3-(1,5-dimethyl-2-pyrrolidinyl)indole free base was prepared by substituting 7-ethylindole and 1,5-dimethyl-2-pyrrolidone for 7-methylindole and 1-methyl-2-pyrrolidone to produce 7-ethyl-3-(1,5-dimethyl-2-pyrrolidinylidene)-3H-indole and reducing the latter with sodium borohydride.

EXAMPLE 13.—1-BENZYL-3-(1,4-DIETHYL-2-PYRROLIDINYL)INDOLE

In the same manner as shown in Example 5A, 1-benzyl-3-(1,4-diethyl-2-pyrrolidinyl)indole free base was prepared by substituting 1,4-diethyl-2-pyrrolidone for 1-methyl-2-pyrrolidone.

In the same manner as shown in Example 5B, 1-benzyl-3 - (1,4-diethyl-2 - pyrrolidinyl)indole hydrochloride was prepared by substituting 1-benzyl-3-(1,4-diethyl-2-pyrrolidinyl)indole free base and hydrogen chloride for 1-benzyl-3-(1-methyl-2-pyrrolidinyl indole free base and cyclohexanesulfamic acid.

EXAMPLE 14.—3-(1,3,5 - TRIMETHYL-2-PYRROLIDINYL)INDOLE

In the same manner as shown in Example 6, 3-(1,3,5-trimethyl-2-pyrrolidinyl)indole free base was prepared by substituting indole and 1,3,5-trimethyl-2-pyrrolidone for 7-methyl-indole and 1-methyl-2-pyrrolidone to produce 3-(1,3,5-trimethyl-2-pyrrolidinylidene)-3H-indole and reducing the latter with sodium borohydride.

In the same manner as shown in Example 5B, 3-(1,3,5 - trimethyl-2-pyrrolidinyl)indole lactate was prepared by substituting 3 - (1,3,5 - trimethyl-2-pyrrolidinyl) indole free base and lactic acid for 1-benzyl-3-(1-methyl-2-pyrrolidinyl)indole free base and cyclohexanesulfamic acid.

EXAMPLE 15.—6-METHYL-3-(1,3,3-TRIMETHYL-2-PYRROLIDINYL)INDOLE FREE BASE

In the same manner as shown in Example 6, 6-methyl-3 - (1,3,3 - trimethyl-2-pyrrolidinyl)indole free base was prepared by substituting 6-methylindole and 1,3,3-trimethyl-2-pyrrolidone for 7-methylindole and 1-methyl-2-pyrrolidone to produce 6 - methyl - 3-(1,3,3-trimethyl-2-pyrrolidinylidene)-3H-indole and reducing the latter with sodium borohydride.

EXAMPLE 16.—1,5 - DIPROPYL - 3 - (1 - ETHYL-4-PROPYL-2-PYRROLIDINYL)INDOLE

In the same manner as shown in Example 5A, 1,5-dipropyl-3 - (1-ethyl-4-propyl-2-pyrrolidinyl)indole free base was prepared by substituting 1-ethyl-4-propyl-2-pyrrolidone and 1,5 - dipropylindole for 1 - methyl - 2 - pyrrolidone and 1-benzylindole.

In the same manner as shown in Example 5B, 1,5-dipropyl-3-(1-ethyl-4-propyl-2-pyrrolidinyl)indole acetate was prepared by substituting 1,5-dipropyl-3-(1-ethyl-4-propyl-2-pyrrolidinyl)indole free base and acetic acid for 1-benzyl-3-(1-methyl-2-pyrrolidinyl)indole free base and cyclohexanesulfamic acid.

EXAMPLE 17.—1,6-DIBUTYL-3-(1,3,3-TRIETHYL-2-PYRROLIDINYL)INDOLE FREE BASE

In the same manner as shown in Example 5A, 1,6-dibutyl-3-(1,3,3 - triethyl-2-pyrrolidinyl)indole free base was prepared by substituting 1,6-dibutylindole and 1,3,3-triethyl-2-pyrrolidone for 1-benzylindole and 1-methyl-2-pyrrolidone.

EXAMPLE 18.—4,5 - DIPROPYL-3-(1,4-DIETHYL-4-METHYL-2-PYRROLIDINYL)INDOLE

In the same manner as shown in Example 6, 4,5-dipropyl-3 - (1,4 - diethyl-4-methyl-2-pyrrolidinyl)indole free base was prepared by substituting 4,5-dipropylindole and 1,4-diethyl-4-methyl-2-pyrrolidone for 7-methylindole and 1-methyl-2-pyrrolidone to produce 4,5-dipropyl-3-(1,4-diethyl-4-methyl-2-pyrrolidinylidene) - 3H - indole and reducing the latter with sodium borohydride.

In the same manner as shown in Example 5B, 4,5-dipropyl-3-(1,4-diethyl - 4 - methyl - 2 - pyrrolidinyl)indole tartrate was prepared by substituting 4,5-dipropyl-3-(1,4-diethyl-4-methyl - 2 - pyrrolidinyl)indole free base and tartaric acid for 1-benzyl-3-(1-methyl-2-pyrrolidinyl indole free base and cyclohexanesulfamic acid.

EXAMPLE 19.—1-PROPYL-6-ETHYL-3-(1-ETHYL-4-METHYL-2-PYRROLIDINYL)-INDOLE FREE BASE

In the same manner as shown in Example 5A, 1-propyl - 6 - ethyl - 3 - (1-ethyl-4-methyl-2-pyrrolidinyl)indole free base was prepared by substituting 1-propyl-6-ethylindole and 1-ethyl-4-methyl - 2 - pyrrolidone for 1-benzylindole and 1-methyl-2-pyrrolidone.

EXAMPLE 20.—1-BUTYL-4-METHYL-7-ISOPROPYL-3-(1-BUTYL-3,3-DIETHYL - 2 - PYRROLIDINYL) INDOLE FREE BASE

In the same manner as shown in Example 5A, 1-butyl-4-methyl-7-isopropyl - 3 - (1 - butyl-3,3-diethyl-2-pyrrolidinyl)indole free base was prepared by substituting 1-butyl-4-methyl-7-isopropylindole and 1-butyl-3,3-diethyl-2-pyrrolidone for 1-benzylindole and 1-methyl-2-pyrrolidone.

EXAMPLE 21.—1 - BENZYL-5-METHYL-3-(1-METHYL-5-BUTYL-2 - PYRROLIDINYL)INDOLE FREE BASE

In the same manner as shown in Example 5A, 1-benzyl-5-methyl-3-(1-methyl - 5 - butyl - 2 - pyrrolidinyl)indole free base was prepared by substituting 1-benzyl-5-methylindole and 1-methyl-5-butyl-2-pyrrolidone for 1-benzylindole and 1-methyl-2-pyrrolidone.

EXAMPLE 22.—3 - (1 - ETHYL - 5,5 - DIMETHYL-2-PYRROLIDINYL)INDOLE FREE BASE

*(A) 3-(4-methyl-4-nitrovaleryl)indole*

In the same manner as shown in Example 3, Part A, 3-(4-methyl-4-nitrovaleryl)indole was prepared by substituting 2-nitropropane for nitroethane. The compound melted between 203–204° C.

*(B) 3-(5,5-dimethyl-1-pyrrolin-2-yl)indole*

In the same manner as shown in Example 3, Part B, 3 - (5,5-dimethyl-1-pyrrolin-2-yl)indole was prepared by hydrogenating 3-(4-methyl-4-nitrovaleryl)indole instead of 3-(4-nitrovaleryl)indole. The compound melted between 197–198° C.

Ultraviolet spectrum (ethanol) showed $\lambda_{max.}$ 219 (26,700); 255 (11,650); 271 (10,150); 289 (11,350); sh. 300 (8,800); sh. 330 (2,400).

*Analysis.*—Calcd. for $C_{14}H_{16}N_2$(percent): C, 79.21; H, 7.60; N, 13.20. Found (percent): C, 79.10; H, 7.19; N, 13.23.

*(C) 3-(5,5-dimethyl-2-pyrrolidinyl)indole free base*

In the same manner as shown in Example 3, Part C, 3-(5,5 - dimethyl-2-pyrrolidinyl)indole hydrochloride was prepared by substituting 3-(5,5-dimethyl-1-pyrrolin-2-yl) indole for 3-(5-methyl-1-pyrrolin-2-yl)indole. The compound melted between 229–230° C. (dec.). The hydrochloride was dissolved in water and basified with 15% aqueous sodium hydroxide solution and extracted with ether. The combined extracts were washed with saturated salt solution, dried over anhydrous sodium sulfate and evaporated, to give 3-(5,5-dimethyl-2-pyrrolidinyl)indole free base melting between 104.5–106° C.

*(D) 3-(1-acetyl-5,5-dimethyl-2-pyrrolidinyl)indole*

6 g. (0.028 mole) of 3-(5,5-dimethyl-2-pyrrolidinyl) indole free base was dissolved in 60 ml. of acetic anhydride and the solution was allowed to stand for 12 hours at 25° C. The resulting suspension was filtered and the solid was washed with ether to obtain 4.4 g. of 3-(1-acetyl-5,5-dimethyl-2-pyrrolidinyl)indole which melted at 204–206° C.

*Analysis.*—Calc'd for $C_{16}H_{20}N_2O$ (percent): C, 74.96; H, 7.86; N, 10.93. Found (percent): C, 74.86; H, 8.20; N, 10.86.

(E) 3-(1-ethyl-5,5-dimethyl-2-pyrrolidinyl)indole free base

A solution of 3-(1-acetyl-5,5-dimethyl-2-pyrrolidinyl)indole (0.6 g.; 2.34 millimoles) in 100 ml. of benzene was added to a solution of lithium aluminum hydride (0.6 g.) in 100 ml. of benzene. The mixture was refluxed for 12 hr. and was then allowed to stand for 24 hr. The mixture was decomposed by the successive addition of 1 ml. of water, 1 ml. of 15% sodium hydroxide solution, and 3 ml. of water. The mixture was filtered and the filtrate was evaporated to dryness to give 0.5 g. of an oil. Crystallization from petroleum ether (B.P. 30–60° C.) afforded 0.45 g. (80% yield) of 3-(1-ethyl-5,5-dimethyl-2-pyrrolidinyl)indole free base which melted between 82–85° C.

*Analysis.*—Calc'd for $C_{16}H_{22}N_2$ (percent): C, 79.29; H, 9.15; N, 11.56. Found (percent): C, 79.14; H, 9.33; N, 11.29.

EXAMPLE 23

3-(1,5,5-trimethyl-2-pyrrolidinyl)indole free base

A solution of 24.84 g. (0.116 mole) of 3-(5,5-dimethyl-2-pyrrolidinyl)indole free base (Example 22C) in 350 ml. of methanol and 116 ml. of methyl iodide was refluxed under nitrogen for 48 hr. It was evaporated to dryness under reduced pressure and the residue was triturated with methanol. The resulting solid was dissolved in 500 ml. of water. The solution was cooled, basified with sodium hydroxide, and extracted with methylene chloride. The extract was washed with saturated salt solution, dried over sodium sulfate and evaporated, to give 18.8 g. of an oily solid. The solid was chromatographed on 300 g. of silica. Elution with 3150 ml. of ethyl acetate afforded 3 - (1,5,5 - trimethyl-2-pyrrolidinyl)indole free base, which on recrystallization from ether-petroleum ether (B.P. 30–60° C.) weighed 6.9 g. (26% yield) and melted between 138–140° C.

*Analysis.*—Calc'd for $C_{15}H_{20}N_2$ (percent): C, 78.90; H, 8.83; N, 12.27. Found (percent): C, 78.48; H, 8.74; N, 12.26.

EXAMPLE 24

1-methyl-3-(1-methyl-2-pyrrolidinyl)indole free base

(A) 3-(1-methyl-2-pyrrolidinylidene)-3H-indole

In the same manner as shown in Example 3A, 3-(4-nitrobutyryl)indole was prepared by substituting nitromethane for nitroethane. The compound melted between 178–180° C.

The 3-(4-nitrobutyryl)indole was reduced and concomitantly cyclized utilizing Raney nickel catalyst in the manner described in Example 3B to produce 3-(1-pyrrolin-2-yl)indole which melted between 182.5–183.5° C.

Methyl iodine (25 ml.) was added to a solution of 3-(1-pyrrolin-2-yl)indole (9.2 g.; 0.05 mole) in 75 ml. of methanol and the solution was refluxed for 1.5 hr. The resulting suspension was cooled in ice and filtered to give 11.3 g. (70% yield) of 3-(1-methyl-2-pyrrolidinylidene)-3H-indole hydroiodide melting between 270–283° C. Two recrystallizations from methanol afforded long needles, darkening at 280° C. and melting between 293–296° C. (dec.).

A suspension of 3-(1-methyl-2-pyrrolidinylidene)-3H-indole hydroiodide (1.6 g.; 0.005 mole) in 10 ml. of water, 25 ml. of benzene, 30 ml. of 1 N sodium hydroxide, 25 ml. of methylene chloride, and 10 ml. of methanol was shaken until two clear layers resulted. The aqueous layer was extracted twice with methylene chloride and the combined extracts were washed with saturated salt solution, dried over anhydrous sodium sulfate and evaporated, to give 0.9 g. (91% yield) of 3-(1-methyl-2-pyrrolidinylidene)-3H-indole free base.

*Analysis.*—Calc'd for $C_{13}H_{14}N_2$ (percent): C, 78.75; H, 7.12; N, 14.13. Found (percent): C, 78.44; H, 6.74; N, 13.88.

(B) 3-(1-methyl-2-pyrrolidinylidene)-3H-indole methiodide

A solution of 3-(1-methyl-2-pyrrolidinylidene)-3H-indole free base (0.5 g.) in 10 ml. of methanol and 5 ml. of methyl iodide was refluxed under nitrogen for 24 hrs. The solution was evaporated to dryness to produce 3-(1-methyl-2-pyrrolidinylidene)-3H-indole methiodide which melted between 248–250° C. After recrystallization from methanol, the compound melted between 249–251° C.

*Analysis.*—Calc'd for $C_{14}H_{17}IN_2$ (percent): C, 49.42; H, 5.04; I, 37.30; N, 8.24. Found (percent): C, 49.25; H, 4.63; I, 37.05; N, 8.39.

(C) 1-methyl-3-(1-methyl-2-pyrrolidinyl)indole free base

The 3-(1-methyl-2-pyrrolidinylidene)-3H-indole methiodide (Part B) was dissolved in 75 ml. of hot ethanol, the solution was cooled to about 60° C., and treated with 1 g. of sodium borohydride. The resulting solution was stirred at 25° C. for 21 hrs. and evaporated under reduced pressure. Water was then added and the mixture was extracted twice with ether. The combined extracts were washed with water, saturated salt solution, dried over anhydrous sodium sulfate and evaporated, to give 0.536 g. of an oily solid. The solid was dissolved in 10 ml. of acetone and chromatographed on 10 g. of silica (50–200 mesh). Elution with four 20-ml. portions of acetone followed by two 20-ml. portions of 2% methanol-acetone gave 0.336 g. of 1-methyl-3-(1-methyl-2-pyrrolidinyl)indole free base. The compound was identical with the 1-methyl-3-(1-methyl-2-pyrrolidinyl)indole free base prepared in Example 2A.

EXAMPLE 26.—4-CHLORO-3-(1-METHYL-2-PYRROLIDINYL)INDOLE FREE BASE

(A) 4-chloro-3-(1-methyl-2-pyrrolidinylidene)-3H-indole

Phosphorus oxychloride (40.8 g.; 0.26 mole) was added with stirring to 50 ml. (0.5 mole) of 1-methyl-2-pyrrolidone cooled in an ice bath at such a rate (25 minutes) that the temperature of the reaction mixture did not exceed 15° C. The yellow paste was stirred an additional 10 minutes while cooled in the ice bath. To this material was added with stirring a solution of 20 g. (0.132 mole) of 4-chloroindole in 75 ml. (0.75 mole) of 1-methyl-2-pyrrolidone during 15 minutes. The orange solution was heated at 85° C. for 2 hours. The green solution was treated with 1 liter of water. An oil separated. The mixture was extracted with two 600-ml. portions of ether. The aqueous layer was basified by the addition of a solution of 70 g. of sodium hydroxide in 300 ml. of water. A yellow solid began separating after several hours. The mixture was allowed to stand for 12 hours. The solid was collected by filtration and washed with water, giving 15.1 g. (49% yield) of 4-chloro-3-(1-methyl-2-pyrrolidinylidene)-3H-indole. A portion was recrystallized three times from aqueous methanol, affording pale green plates, sintering at 165° C. and melting between 169–172° C.

*Analysis.*—Calcd. for $C_{13}H_{13}ClN_2$ (percent): C, 67.10; H, 5.63; Cl, 15.23; N, 12.04. Found (percent): C, 67.17; H, 5.78; Cl, 15.33; N, 11.70.

(B) 4-chloro-3-(1-methyl-2-pyrrolidinyl)indole free base

A mixture of 13.15 g. of 4-chloro-3-(1-methyl-2-pyrrolidinylidene)-3H-indole, 8 g. of sodium borohydride, and 300 ml. of absolute ethanol was allowed to stand for 12 hours at 25° C. An additional 7 g. of sodium borohydride and 200 ml. of absolute ethanol were then added and the mixture was allowed to stand an additional 3 days at 25° C. The solvent was removed under reduced pressure on the steam bath. The residue was treated with 400 ml. of water. A solid separated. The mixture was extracted with two 400-ml. portions of ether. The combined ether extracts were washed with three 200-ml. portions of water and dried over anhydrous magnesium sulfate. The ether solution was concentrated, Skellysolve B was added, and evaporation was continued until crystals separated. Cooling produced 9.15 g. of pale yellow prisms, M.P. 148–152.5° C. Recrystallization from acetone-Skellysolve B gave 7.8 g. (59% yield) of 4-chloro-3-(1-methyl-2-pyrrolidinyl)indole free base as pale yellow prisms, M.P. 157–158.5° C. Recrystallization from acetone-Skellysolve B gave colorless prisms, M.P. 157–158.5° C.

Ultraviolet spectrum (ethanol) showed $\lambda_{max}$. 223 (38,050); sh. 276 (6,100); 282 (6,700); sh. 290 (6,000).

*Analysis.*—Calcd. for $C_{13}H_{15}ClN_2$ (percent): C, 66.53; H, 6.44; Cl, 15.11; N, 11.94. Found (percent): C, 66.58; H, 6.44; Cl, 15.10; N, 11.53.

EXAMPLE 27.—5-BROMO-3-(1-METHYL-2-PYRROLIDINYL)INDOLE FREE BASE (A) *5-bromo-3-(1-methyl-2-pyrrolidinylidene)-3H-indole*

Phosphorus oxychloride (40.8 g.; 0.26 mole) was added with stirring to 75 ml. (0.75 mole) of 1-methyl-2-pyrrolidone cooled in an ice bath at such a rate (25 minutes) that the temperature of the reaction mixture did not exceed 15° C. The yellow paste was stirred an additional 10 minutes while cooled in the ice bath. To this material was added with stirring a solution of 47.1 g. (0.24 mole) of 5-bromoindole in 75 ml. of 1-methyl-2-pyrrolidone during 12 minutes. The ice bath was removed. The red solution was allowed to stand for 40 minutes and was then heated at 85° C. for 2 hours. The brown solution was treated with 1 liter of water, giving an orange solution. The solution was basified by the addition of a solution of 60 g. of sodium hydroxide in 300 ml. of water. The solid which separated was collected by filtration and washed with water. Recrystallization from aqueous methanol gave 55 g. (82% yield) of 5-bromo-3-(1-methyl-2-pyrrolidinylidene)-3H-indole as buff crystals, sintering at 200° C. and melting between 205–208° C. (dec.). A portion was recrystallized twice from aqueous methanol giving buff plates, sintering at 202° C. and melting between 207–210° C. (dec.).

*Analysis.*—Calcd. for $C_{13}H_{13}BrN_2$ (percent): C, 56.32; H, 4.73; Br, 28.83; N, 10.11. Found (percent): C, 56.39; H, 4.59; Br, 28.85; N, 9.61.

(B) *5-bromo-3-(1-methyl-2-pyrrolidinyl)indole free base*

A mixture of 35 g. of 5-bromo-3-(1-methyl-2-pyrrolidinylidene)-3H-indole, 18 g. of sodium borohydride, and 600 ml. of absolute ethanol was allowed to stand for 16 hours at 25° C. The solvent was removed under reduced pressure on the steam bath. The residue was treated with 400 ml. of water. A solid separated. The mixture was extracted with two 400-ml. portions of ether. The combined ether extracts were washed with three 200-ml. portions of water, treated with charcoal, and dried over anhydrous magnesium sulfate. The ether solution was concentrated, Skellysolve B was added, and evaporation was continued until crystals began separating. Cooling produced 31.3 g. of ivory prisms, M.P. 127–132° C. Recrystallization from acetone-Skellysolve B (charcoal) gave 25.5 g. (72% yield) of 5-bromo-3-(1-methyl-2-pyrrolidinyl)indole free base as ivory prisms, M.P. 136–139.5° C. Recrystallization from acetone-Skellysolve B afforded ivory prisms, M.P. 139–141° C.

Ultraviolet spectrum (ethanol) showed $\lambda_{max}$. 226 (36,150); sh. 284 (5,250); 289 (5,650); sh. 298 (4,400).

*Analysis.*—Calcd. for $C_{13}H_{15}BrN_2$ (percent): C, 55.92; H, 5.42; Br, 28.62; N, 10.04. Found (percent): C, 56.12; H, 5.25; Br, 28.52; N, 9.62.

EXAMPLE 28.—3-(1-BUTYL-2-PYRROLIDINYL)INDOLE CYCLOHEXANESULFAMATE ETHANOL SOLVATE (A) *3-(1-butyl-2-pyrrolidinylidene)-3H-indole*

Phosphorus oxychloride (40.8 g.; 0.26 mole) was added with stirring to 62 g. (0.44 mole) of 1-butyl-2-pyrrolidone (Adams et al., J. Amer. Chem. Soc. 64, 2588, 1942) cooled in an ice bath at such a rate (25 minutes) that the temperature of the reaction mixture did not exceed 15° C. The yellow solution was stirred an additional 10 minutes while cooled in the ice bath. To this material was added with stirring a solution of 28 g. (0.24 mole) of indole in 50 g. (0.35 mole) of 1-butyl-2-pyrrolidone during 15 minutes. The temperature did not rise above 10° C. The ice bath was removed and in 18 minutes the temperature had risen to 75° C. and then began falling. The orange solution was heated at 85° C. for 2 hours. The red solution was treated with 1000 ml. of water, giving a clear orange solution. The solution was extracted with two 500-ml. portions of ether. The aqueous layer was basified by the addition of a solution of 60 g. of sodium hydroxide in 300 ml. of water. A yellow oil separated. The mixture was extracted with two 700-ml. portions of ether. The combined ether extracts were washed with two 300-ml. portions of water and dried over anhydrous magnesium sulfate. The drying agent was removed by filtration and was washed with warm benzene to dissolve some product which had precipitated. The solution was concentrated, Skellysolve B was added, and the solution was concentrated further. Cooling produced 54.5 g. of yellow needles. Recrystallization from acetone-Skellysolve B gave 51 g. of buff crystals. Recrystallization from acetone-Skellysolve B (charcoal) gave 43.5 g. (75% yield) of buff needles which sintered and then melted between 129–132° C. A portion was recrystallized twice from acetone-Skellysolve B, affording 3-(1-butyl-2-pyrrolidinylidene)-3H-indole as pale green needles which sintered at 127° C. and melted between 131–134° C.

*Analysis.*—Calcd. for $C_{16}H_{20}N_2$ (percent): C, 79.95; H, 8.39; N, 11.66. Found (percent): C, 79.95; H, 8.22; N, 11.48.

(B) *3-(1-butyl-2-pyrrolidinyl)indole cyclohexanesulfamate ethanol solvate*

A mixture of 47 g. of 3-(1-butyl-2-pyrrolidinylidene)-3H-indole, 21 g. of sodium borohydride, and 500 ml. of absolute ethanol was allowed to stand for 12 hours at 25° C. The solvent was removed under reduced pressure on the steam bath. The residue was treated with 400 ml. of water. An oil separated. The mixture was extracted with two 400-ml. portions of ether. The combined ether extracts were washed with three 200-ml. portions of water and dried over anhydrous magnesium sulfate. The ether was evaporated, yielding 44.5 g. of 3-(1-butyl-2-pyrrolidinyl)indole free base as a yellow oil. A 44 g. (0.181 mole) portion of 3-(1-butyl-2-pyrrolidinyl)indole free base and 32.5 g. (0.181 mole) of cyclohexanesulfamic acid were dissolved in 100 ml. of warm absolute ethanol. Anhydrous ether was added until the cloud point was reached. Cooling produced a solid. The solid was crystallized from ethanol-ether, giving 74 g. (87% yield) of colorless needles, sintering at 115° C. and melting between 119–121° C. A portion was recrystallized once from ethanol-ether and twice from ethanol, affording colorless needles of 3-(1-butyl-2-pyrrolidinyl)indole cyclohexanesulfamate ethanol solvate, sintering at 114° C. and melting between 116–118° C.

Ultraviolet spectrum (ethanol) showed $\lambda_{max}$. 214 (41,500); sh. 275 (6,150); sh. 280 (6,150); 287 (5,600).

*Analysis.*—Calcd. for $C_{22}H_{35}N_3O_3S \cdot C_2H_5OH$ (percent): C, 61.63; H, 8.83; N, 8.98; S, 6.86. Found (percent): C, 61.69; H, 8.41; N, 9.36; S, 7.17.

EXAMPLE 29.—3-(1-ETHYL-2-PYRROLIDINYL)INDOLE HYDROCHLORIDE (A) *3-(1-ethyl-2-pyrrolidinylidene)-3H-indole*

Phosphorus oxychloride (40.8 g.; 0.26 mole) was added with stirring to 49 g. (0.43 mole) of 1-ethyl-2-pyrrolidone (Leonard et al., J. Amer. Chem. Soc. 75, 3727, 1953)

cooled in an ice bath at such a rate (20 minutes) that the temperature of the reaction mixture did not exceed 15° C. The yellow solution was stirred an additional 10 minutes while cooled in the ice bath. To this material was added with stirring a solution of 28 g. (0.24 mole) of indole in 49 g. (0.43 mole) of 1-ethyl-2-pyrrolidone during 15 minutes. The temperature did not rise above 10° C. The ice bath was substituted by a warm water bath. In about 5 minutes the temperature began rising rapidly. When the temperature of the reaction mixture reached 85° C. the water bath was replaced by an ice bath. The mixture formed a thick paste. The paste was heated at 80° C. for 2 hours and was then dissolved in 1 liter of water, giving a clear orange solution. The solution was basified by the addition of a solution of 60 g. of sodium hydroxide in 300 ml. of water. The solid which separated was collected by filtration and washed with water. Crystallization from aqueous methanol gave 48.5 g. (95% yield) of yellow needles, M.P. 157–159° C. (dec.) with sintering at 154° C. A portion was recrystallized twice from acetone-Skellysolve B, affording 3 - (1 - ethyl-2-pyrrolidinylidene)-3H-indole as colorless needles sintering at 155° C. and melting between 160–162° C. (dec.).

*Analysis.*—Calcd. for $C_{14}H_{16}N_2$ (percent): C, 79.21; H, 7.60; N, 13.20. Found (percent): C, 78.91; H, 7.35; N, 12.90.

*(B) 3-(1-ethyl-2-pyrrolidinyl)indole hydrochloride*

A mixture of 45.5 g. of 3-(1-ethyl-2-pyrrolidinylidene)-3H-indole, 24 g. of sodium borohydride, and 500 ml. of absolute ethanol was allowed to stand for 12 hours at 25° C. The solvent was removed under reduced pressure on the steam bath. The residue was treated with 500 ml. of water. An oil separated. The mixture was extracted with two 400-ml. portions of ether. The combined ether extracts were washed with three 200-ml. portions of water, treated with charcoal, and dried over anhydrous magnesium sulfate. The ether was almost completely evaporated, 800 ml. of Skellysolve B was added, and the volume was reduced to 300 ml. The solution was slurried with a filter aid and filtered. Cooling in the freezer produced a solid which was recrystallized from ether-Skellysolve B, giving 40 g. of pale yellow prisms, M.P. 60–70° C. (sint. 55° C.). One recrystallization from ether-Skellysolve B and two recrystallizations from acetone-Skellysolve B afforded ivory prisms, M.P. 66–73° C. (sint. 57° C.). A 15.8 g. portion of material with M.P. 63–73° C. (sint. 55° C.) was dissolved in 200 ml. of anhydrous ether and the solution was treated with ethereal hydrogen chloride. The crude hydrochloride was collected by filtration and crystallized from ethanol-ether, giving 16.7 g. of colorless plates of 3-(1-ethyl-2-pyrrolidinyl)indole hydrochloride, M.P. 198–200° C. (sint. 196° C.). Recrystallization from ethanol-ether afforded colorless plates, M.P. 200–202° C. (sint. 198° C.).

Ultraviolet spectrum (ethanol) showed $\lambda_{max.}$ 214 (47,550); 271 (6,750); 279 (6,900); 287 (6,200).

*Analysis.*—Calcd. for $C_{14}H_{19}ClN_2$ (percent): C, 67.04; H, 7.64; Cl, 14.14; N, 11.18. Found (percent): C, 66.77; H, 7.20; Cl, 13.97; N, 11.07.

EXAMPLE 30.—3(1,4-DIMETHYL-2-PYRROLIDINYL)INDOLE HYDROCHLORIDE

*(A) 1,4-dimethyl-2-pyrrolidone*

A mixture of 23.5 g. of β-methaylbutyrolactone (Wheeler et al., J. Org. Chem. 26, 3221, 1961) and 65 ml. of methylamine was heated at 280° C. for 4 hours. After removal of excess methylamine and water, the product, 1,4 - dimethyl - 2 - pyrrolidone, distilled as a colorless oil boiling at 120–125° C./50 mm.; $n_D^{25}$ 1.4588; 16.3 g. (62% yield.)

*(B) 3-(1,4-dimethyl-2-pyrrolidinylidene)-3H-indole*

Phosphorus oxychloride (20.4 g.; 0.13 mole) was added with stirring during 25 minutes to 8 g. (0.0706 mole) of 1,4-dimethyl-2-pyrrolidone cooled in an ice bath. The red solution was stirred an additional 10 minutes while cooled in the ice bath. To this material cooled in an ice bath was added with stirring a solution of 8.3 g. (0.0706 mole) of indole in 8 g. (0.0706 mole) of 1,4-dimethyl-2-pyrrolidone during 15 minutes. The red solution was heated at 90° C. for 2 hours and then was treated with 300 ml. of water. The solution was basified by the addition of a solution of 30 g. of sodium hydroxide in 150 ml. of water. The resulting thick paste was diluted with 400 ml. of water, filtered, and the pink solid was washed with water. Crystallization from aqueous methanol (charcoal) gave 6.2 g. of pink plates, M.P. 170–173° C. (dec.) (sint. 167° C.), and a gummy material. The gummy material was slurried with ether, filtered, and crystallized from acetone-Skellysolve B, giving 1.7 g. of pale yellow needle, M.P. 173–176° C. (dec.) (sint. 169° C.). The total yield of 3-(1,4-dimethyl-2-pyrrolidinylidene) - 3H - indole was 7.9 g. (53%). A portion was recrystallized from acetone-Skelleysolve B, affording pale yellow needles, M.P. 175–177° C. (dec.) (sint. 172° C.).

*Analysis.*—Calcd. for $C_{14}H_{16}N_2$ (percent): C, 79.21; H, 760; N, 13.20. Found (percent): C, 78.94; H, 7.65; N, 12.93.

*(C) 3-(1,4-dimethyl-2-pyrrolidinyl)indole hydrochloride*

A mixture of 6.9 g. of 3 - (1,4-dimethyl-2-pyrrolidinylidene)-3H-indole, 8 g. of sodium borohydride, and 400 ml. of absolute ethanol was allowed to stand for 12 hours at 25° C. The solvent was removed under reduced pressure on the steam bath. The residue was treated with 300 ml. of water. The mixture was extracted with two 400-ml. portions of ether. The combined ether extracts were washed with two 200-ml. portions of water and dried over anhydrous magnesium sulfate. The ether solution containing 3 - (1,4 - dimethyl-2-pyrrolidinyl)indole free base was treated with ethereal hydrogen chloride. The sticky solid which separated was crystallized from methanol-ether, giving 5.3 g. of brown crystals. Recrystallization from methanol-ether (charcoal) gave 4.2 g. (51% yield) of tan prisms, M.P. 197–200° C. Recrystallizations from methanol-ether afforded ivory prisms of 3-(1,4 - dimethyl-2-pyrrolidinyl)indole hydrochloride, M.P. 197–200° C.

Ultraviolet spectrum (ethanol) showed $\lambda_{max.}$ 214 (44,100); 270 (6,700); sh. 276 (6,700); 279 (6,700); 287 (6,000).

*Analysis.*—Calcd. for $C_{14}H_{19}ClN_2$ (percent): C, 67.04; H, 764; Cl, 14.14; N, 11.18. Found (percent): C, 66.67; H, 7.67; Cl, 14,21; N, 11.08.

EXAMPLE 31.—3-(1,3-DIMETHYL-2-PYRROLIDINYL)INDOLE HYDROCHLORIDE

*(A) 3-(2-methyl-3-dimethylaminopropionyl)indole methiodide methanol solvate*

To a solution of 62.8 g. (0.272 mole) of 3-(2-methyl-3-dimethylaminopropylonyl)indole (U.S. Patent 3,037,-991) in 300 ml. of methanol cooled in an ice bath was added 42.6 g. (0.3 mole) of methyl idodide. After 30 minutes the ice bath was removed and crystals soon began separating. The reaction mixture was allowed to stand for 12 hours at 25° C. and was then cooled to give 100 g. (91% yield) of nearly colorless prisms. A portion was recrystallized twice from methanol and once from ethanol, giving colorless prisms of 3 - (2 - methyl-3-dimethylaminopropionyl)indole methiodide methanol solvate, M.P. 174–177° C. (dec.).

*Analysis.*—Calcd. for $C_{15}H_{21}IN_2O \cdot CH_3OH$ (percent): C, 47.53; H, 6.23; I, 31.39; N, 6.93. Found (percent); C, 47.92; H, 6.17; I, 31.30; N, 7.02.

(B) 3-(2-methyl-3-cyanopropionyl)indole

A mixture of 8.9 g. (0.022 mole) of 3-(2-methyl-3-dimethylaminopropionyl)indole methiodide methanol solvate, 5 g. (0.102 mole) of sodium cyanide, and 50 ml. of dimethylformamide was heated on the steam bath for 2½ hours. The mixture was poured into 800 ml. of water and cooled in an ice bath. The solid which separated was collected by filtration and washed with water. The solid was crystallized from acetone-Skellysolve B (charcoal), giving 3.05 g. (65% yield) of colorless crystals, M.P. 166–169° C. A portion was recrystallized twice from acetone-Skellysolve B, affording colorless prisms of 3-(2-methyl-3-cyanopropionyl)indole, M.P. 168.5–170° C.

*Analysis.*—Calcd. for $C_{13}H_{12}N_2O$ (percent): C, 73.56; H, 5.70; N, 13.20. Found (percent): C, 73.05; 73.69; H, 5.80, 6.27; N, 12.96.

(C) 3-(3-methyl-1-pyrrolin-2-yl)indole

A mixture of 2.5 g. of 3-(2-methyl-3-cyanopropionyl)indole, 150 ml. of ethanol, and a teaspoon of Raney nickel catalyst was shaken on a Parr apparatus at 49.5 lb. initial hydrogen pressure. After 27 hours the hydrogen uptake ceased. The catalyst was removed by filtration and the solvent was removed under reduced pressure. The oily residue was crystallized from acetone-Skellysolve B, giving 1.8 g. (77% yield) of brown crystals, M.P. 137.5–141° C. (sint. 130° C.). Two recrystallizations from acetone-Skellysolve B afforded brown prisms of 3-(3-methyl-1-pyrrolin-2-yl)indole, M.P. 144–146° C. (sint. 141° C.).

Ultraviolet spectrum (ethanol) showed $\lambda_{max}$. 218.5 (24,700); sh. 250 (10,550); 256 (11,650); sh. 273 (9,600); sh. 280 (10,450); 291 (11,650); sh. 330 (1,500).

*Analysis.*—Calcd. for $C_{13}H_{14}N_2$ (percent): C, 78.75; H, 7.12; N, 14.13. Found (percent): C, 78.67; H, 7.23; N, 13.97.

(D) 3-(1,3-dimethyl-2-pyrrolidinyl)indole hydrochloride (1) *By lithium aluminum hydride reduction.*—A mixture of 9.1 g. of 3-(3-methyl-1-pyrrolin-2-yl)indole, 0.4 g. of platinum oxide catalyst, and 150 ml. of methanol was shaken on a Parr apparatus at 49.5 lb. initial hydrogen pressure. After 21½ hours one equivalent of hydrogen was absorbed. The catalyst was removed by filtration and the solvent was removed under reduced pressure on the steam bath. The residual brown oil, 3-(3-methyl-2-pyrrolidinyl)indole free base, and 200 ml. of methyl formate was heated under reflux for 3 days. The excess methyl formate was removed under reduced pressure on the steam bath. The residue was shaken with 800 ml. of ether. The ether solution was extracted with two 150-ml. portions of 2 N hydrochloric acid, washed with three 200-ml. portions of water, and dried over anhydrous magnesium sulfate. The ether was evaporated, giving 4.7 g. of brown oil. The oil was dissolved in a mixture of 50 ml. of dry benzene and 50 ml. of dry ether. The solution was added during 30 minutes to a stirred suspension of 7 g. of lithium aluminum hydride in 250 ml. of dry ether. The mixture was heated under reflux for 22 hours, cooled in an ice bath, and decomposed by the addition of 50 ml. of water, followed by 50 ml. of 15% aqueous sodium hydroxide solution. The organic layer was decanted from the thick inorganic paste. The paste was stirred with two 250-ml. portions of ether followed by decantation. The combined ether extracts were washed with two 200-ml. portions of water and dried over anhydrous magnesium sulfate. The ether was evaporated. The oily residue, 3-(1,3-dimethyl-2-pyrrolidinyl)indole free base, was dissolved in 150 ml. of ether and treated with ethereal hydrogen chloride. The solid was filtered and crystallized twice from methanol-isopropanol-ether, giving 2.7 g. (23% yield) of pale pink needles, M.P. 208–211° C. Two recrystallizations from methanol-isopropanol-ether afforded ivory needles of 3-(1,3-dimethyl-2-pyrrolidinyl)indole hydrochloride, M.P. 211–214° C.

Ultraviolet spectrum (ethanol) showed $\lambda_{max}$. 214 (43,650); 270 (6,650); sh. 277 (6,650); 278.5 (6,700); 286 (5,900).

*Analysis.*—Calcd. for $C_{14}H_{19}ClN_2$ (percent): C, 67.04; H, 7.64; Cl, 14.14; N, 11.18. Found (percent): C, 67.03; H, 7.49; Cl, 14.05; N, 10.99.

(2) *By sodium borohydride reduction.*—A mixture of 2.1 g. of 3-(3-methyl-1-pyrrolin-2-yl)indole (Part C), 5 ml. of methyl iodide, and 75 ml. of methanol was heated under reflux for 2½ hours. The methanol and excess methyl iodide were removed under reduced pressure on the steam bath, yielding 3-(1,3-dimethyl-2-pyrrolidinylidene)-3H-indole hydroiodide as a brown oil. The oil was dissolved in 100 ml. of absolute ethanol and 5 g. of sodium borohydride was added. The mixture was allowed to stand at 25° C. for 2½ days. The solvent was removed under reduced pressure on the steam bath. The residue was treated with 100 ml. of water. The mixture was extracted with two 150-ml. portions of ether. The combined ether extracts were washed with three 100-ml. portions of water and dried over anhydrous magnesium sulfate. The solution was concentrated, Skellysolve B was added, and the solution was again concentrated. Cooling caused a small amount of solid to separate which was removed by filtration through charcoal. The filtrate was treated with ethereal hydrogen chloride. The solid was filtered and crystallized from methanol-ether. Two recrystallizations from methanol-isopropanol-ether gave 0.52 g. (19.5% yield) of 3-(1,3-dimethyl-2-pyrrolidinyl)indole hydrochloride as pale pink needles, M.P. 209–213° C. A mixed melting point of this material with that obtained by the above lithium aluminum hydride procedure was not depressed.

EXAMPLE 32.—5-METHOXY-3-(1-METHYL-2-PYRROLIDINYL)INDOLE FREE BASE

(A) 5-methoxy-3-(1-methyl-2-pyrrolidinylidene)-3H-indole

Phosphorus oxychloride (40.8 g.; 0.26 mole) was slowly added at 10° C. (ice bath cooling) to 40 ml. of 1-methyl-2-pyrrolidone. After the addition was complete the mixture was stirred for 15 minutes and a solution of 28.0 g. (0.19 mole) of 5-methoxyindole and 40 ml. of 1-methyl-2-pyrrolidone was slowly added. The ice bath was removed and the mixture was allowed to warm to 35° C. When the temperature began to rise the flask was quickly immersed in an ice bath. The temperature was then held at 70° C. When the temperature began to drop the solution was heated for 1 hour at 65° C., then cooled and ice was added. Enough water was then added to dissolve the mixture. The mixture was filtered and the filtrate was treated with sodium hydroxide, cooled, and filtered. The resulting solid was washed with water and recrystallized from about 50% ethanol to yield 37.8 g. (88% yield) of 5 - methoxy - 3-(1-methyl-2-pyrrolidinylidene)-3H-indole; M.P. 202–204° C.

*Analysis.*—Calcd. for $C_{14}H_{16}N_2O$ (percent): C, 73.65; H, 7.06; N, 12.27. Found (percent): C, 73.66; H, 7.40; N, 12.46.

In the same manner as shown above, 5,6-dimethoxy-3-(1-methyl-2-pyrrolidinylidene)-3H-indole, 5 - ethoxy-2-methyl-3-(1-methyl-2-pyrrolidinylidene) - 3H - indole, 5-propoxy-3-(1-methyl-2-pyrrolidinylidene)-3H-indole, and 6-butoxy-3-(1-methyl-2-pyrrolidinylidene)-3H-indole were prepared by substituting 5,6-dimethoxyindole, 5-ethoxy-2-methylindole, 5-propoxyindole, and 6-butoxyindole, respectively, for 5-methoxyindole.

(B) 5-methoxy-3-(1-methyl-2-pyrrolidinyl)indole free base 4.0 g. (0.017 mole) of 5-methoxy-3-(1-methyl-2-pyrrolidinylidene)-3H-indole was gradually added in the solid state to a mixture of 2.5 g. of lithium aluminum hydride in 100 ml. of tetrahydrofuran. The mixture was refluxed for 4 hours, cooled, and decomposed with wet ether.

Water was slowly added followed by concentrated aqueous sodium hydroxide solution. The mixture was filtered and the filtrate was concentrated to dryness. The residue was recrystallized from Skellysolve B to give 2.9 g. (74% yield) of 5-methoxy-3-(1-methyl-2-pyrrolidinyl)indole free base; M.P. 118–120.5° C.

Ultraviolet spectrum (ethanol) showed $\lambda_{max}$. 275 (6,150); 295 (5,150).

Analysis.—Calcd. for $C_{14}H_{18}N_2O$ (percent): C, 73.01; H, 7.87; N, 12.16. Found (percent): C, 72.74; H, 7.73; N, 12.38.

In the same manner as shown above, 5,6-dimethoxy-3-(1-methyl-2-pyrrolidinyl)indole free base, 5-ethoxy-2-methyl-3-(1-methyl-2-pyrrolidinyl)indole free base, 5-propoxy-3-(1-methyl-2-pyrrolidinyl)indole free base, and 6-butoxy-3-(1-methyl-2-pyrrolidinyl)indole free base were prepared by substituting 5,6-dimethoxy-3-(1-methyl-2-pyrrolidinylidene)-3H-indole, 5-ethoxy-2-methyl-3-(1-methyl-2-pyrrolidinylidene)-3H-indole, 5-propoxy-3-(1-methyl-2-pyrrolidinylidene)-3H-indole, and 6-butoxy - 3 - (1-methyl-2-pyrrolidinylidene)-3H-indole, respectively, for 5-methoxy-3-(1-methyl-2-pyrrolidinylidene)-3H-indole.

EXAMPLE 33.—3-(1-BENZYL-2-PYRROLIDINYL) INDOLE FREE BASE

(A) 3-(1-benzyl-2-pyrrolidinylidene)-3H-indole

Phosphorus oxychloride (40.8 g.; 0.26 mole) was slowly added to 60 ml. of 1-benzyl-2-pyrrolidone at 10° C. After the addition was complete the mixture was stirred for 20 minutes and a solution of 28 g. (0.19 mole) of indole in 40 ml. of 1-benzyl-2-pyrrolidone was added dropwise, keeping the temperature below 27° C. The mixture was then heated at 80° C. for 1 hour, cooled, and ice was added. The solid mass was heated with three 500-ml. portions of water and the mixture was poured into a 2 l. beaker. The aqueous solution was extracted with ether and made basic with 65 g. of sodium hydroxide. The mixture was filtered and the solid was thoroughly washed with water and recrystallized twice from benzene (1 liter for each recrystallization) to yield 29.4 g. (50% yield) of 3-(1-benzyl-2-pyrrolidinylidene)-3H-indole; M.P. 144–148° C. (dec.).

Analysis.—Calcd. for $C_{19}H_{18}N_2$ (percent): C, 83.17; H, 6.61; N, 10.21. Found (percent): C, 82.87; H, 6.84; N, 10.22.

(B) 3(1-benzyl-2-pyrrolidinyl)indole free base

A 19.2 g. (0.07 mole) quantity of 3-(1-benzyl-2-pyrrolidinylidene)-3H-indole was slowly added as a solid to a mixture of 10.0 g. of lithium aluminum hydride and 400 ml. of tetrahydrofuran. The reaction mixture was refluxed for 4 hours, cooled, and decomposed with wet ether, followed by water and concentrated aqueous sodium hydroxide solution. The mixture was filtered and the filtrate was concentrated under reduced pressure to yield 15.0 g. (77% yield) of 3-(1-benzyl-2-pyrrolidinyl) indole free base after recrystallization from Skellysolve B; M.P. 91.5–93° C.

Ultraviolet spectrum (ethanol) showed $\lambda_{max}$. 220 (38,950); sh. 274 (5,850); 281 (7,300); 289 (5,450).

Analysis.—Calcd. for $C_{19}H_{20}N_2$ (percent): C, 82.56; H, 7.29; N, 10.14. Found (percent): C, 82.28; H, 7.36; N, 10.31.

EXAMPLE 34.—6-NITRO-3-(1-METHYL-2-PYRROLIDINYL)INDOLE FREE BASE

A stirred solution of 5.74 g. (28.7 millimoles) of 3-(1-methyl-2-pyrrolidinyl)indole in 25 ml. of acetic acid was cooled to 10° C. and treated dropwise with a solution of 4.3 ml. of nitric acid (density 1.37) in 10 ml. of acetic acid. The temperature of the reaction mixture remained at 5–10° C. during the addition and was kept at 10° C. for an additional hour. The mixture was then allowed to warm to 25° C. and stand for 11 hours. The resulting dark solution was concentrated in vacuo under nitrogen and the residue was poured into ice-water. A water insoluble tar was absorbed on activated carbon and the solution was filtered through diatomaceous earth. The residue was extracted with warm water, and the combined aqueous filtrate (about 400 ml.) was made ammoniacal and extracted with ether. The ether extract was washed with saturated salt solution, dried over anhydrous sodium sulfate, and concentrated. Crystallization of the residue from methanol-water yielded 1.375 g., M.P. 154–155° C. and 0.122 g., M.P. 152.5–154° C. of 6-nitro-3-(1 - methyl - 2 - pyrrolidinyl)indole free base. Chromatography of the residue from this crystallization on silica gel with 20% methanol-chloroform yielded an additional 0.478 g., M.P. 153–154° C. (total yield, 28.1%) of the same compound. An analytical sample, M.P. 154–155° C., was prepared by recrystallization from methanol-water.

Analysis.—Calcd. for $C_{13}H_{15}O_2N_3$ (percent): C, 63.66; H, 6.16; N, 17.13. Found (percent): C, 63.99; H, 6.20; N, 16.71.

The 6-nitro-3-(1-methyl-2-pyrrolidinyl)indole free base was reduced with lithium aluminum hydride to produce 6-amino-3-(1-methyl-2-pyrrolidinyl)indole free base.

EXAMPLE 35.—5-CHLORO-3-(1-METHYL-2-PYRROLIDINYL)INDOLE FREE BASE

(A) 5-chloro-3-(1-methyl-2-pyrrolidinylidene)-3H-indole

Phosphorus oxychloride (40.8 g.; 0.26 mole) was added with stirring to 50 ml. (0.5 mole) of 1-methyl-2-pyrrolidone cooled in an ice bath at such a rate (25 minutes) that the temperature of the reaction mixture did not exceed 15° C. The yellow paste was stirred an additional 10 minutes while cooled in the ice bath. To this material was added with stirring a solution of 9.6 g. (0.063 mole) of 5-chloroindole in 50 ml. of 1-methyl-2-pyrrolidone during 15 minutes. The brown solution was heated at 90° C. for 2 hours. The green solution was treated with 800 ml. of water, giving a yellow solution. The solution was basified by addition of a solution of 60 g. of sodium hydroxide in 300 ml. of water. The resulting yellow paste was filtered and washed with water. The solid was crystallized from aqueous methanol (charcoal) giving 11.2 g. (76% yield) of yellow-brown crystals, M.P. 209–211° C. (dec.) (sint. 201° C.). A portion was recrystallized twice from aqueous methanol, giving pale yellow needles of 5-chloro-3-(1-methyl-2-pyrrolidinylidene)-3H-indole, M.P. 219–221° C. (dec.) (sint. 212 C.).

Analysis.—Calcd. for $C_{13}H_{13}ClN_2$ (percent): C, 67.10; H, 5.63; Cl, 15.23; N, 12.04. Found (percent): C, 67.11; H, 5.55; Cl, 15.48; N, 11.74.

(B) 5-chloro-3-(1-methyl-2-pyrrolidinyl) indole free base

A mixture of 23 g. of 5-chloro-3-(1-methyl-2-pyrrolidinylidene)-3H-indole, 12 g. of sodium borohydride and 250 ml. of absolute ethanol was allowed to stand for 12 hours at 250° C. The solvent was removed under reduced pressure on the steam bath. The residue was treated with 300 ml. of water. A solid separated. The mixture was extracted with two 300-ml. portions of ether. The combined ether extracts were washed with two 100-ml. portions of water and dried over anhydrous magnesium sulfate (charcoal). The ether was evaporated and the residue was crystallized from ether-Skellysolve B, giving 18.3 g. (79% yield) of ivory prisms, M.P. 139.5–141° C. (sint. 135° C.). Recrystallization from ether-Skellysolve B (charcoal) gave 15.6 g. of nearly colorless prisms, M.P. 142–144° C. Recrystallization from ether-Skellysolve B gave colorless prisms of 5 - chloro - 3 - (1 - methyl - 2 - pyrrolidinyl)indole free base, M.P. 143–144.5° C.

Ultraviolet spectrum (ethanol) showed $\lambda_{max}$. 226 (35,150); sh. 283 (5,200); 289 (5,550); sh. 297 (4,250).

*Analysis.*—Calcd. for $C_{13}H_{15}ClN_2$ (percent): C, 66.53; H, 6.44; Cl, 15.11; N, 11.94. Found (percent): C, 66.55; H, 6.64; Cl, 15.16; N, 12.17.

EXAMPLE 36.—5-FLUORO-3-(1-METHYL-2-PYRROLIDINYL)INDOLE FREE BASE

*(A) 5-floro-3-(1-methyl-2-pyrrolidinylidene)-3H-indole*

Phosphorus oxychloride (40.8 g.; 0.26 mole) was added with stirring to 40 ml. (0.4 mole) of 1-methyl-2-pyrrolidone cooled in an ice bath at such a rate (25 minutes) that the temperature of the reaction mixture did not exceed 15° C. The yellow paste was stirred an additional 10 minutes while cooled in the ice bath. To this material was added a solution of 18.9 g. (0.14 mole) of 5-fluoroindole in 60 ml. (0.6 mole) of 1-methyl-2-pyrrolidone at such a rate (25 minutes) that the temperature of the reaction mixture did not exceed 30° C. The resulting yellow solution which contained some solid was then heated at 95° C. for 2½ hours. More solid formed during this time. The reaction mixture was treated with 800 ml. of water, giving an orange solution. The solution was basified with a solution of 60 g. of sodium hydroxide in 300 ml. of water. The solid which separated was collected by filtration and washed with water. Crystallization from aqueous methanol gave 21 g. (69% yield) of ivory solid, M.P. 207–209° C. (dec.) (sint. 201° C.). Two recrystallizations from aqueous methanol afforded ivory needles of 5-fluoro-3-(1-methyl-2-pyrrolidinylidene)-3H-indole, M.P. 211–213° C. (dec.) (sint. 205° C.).

*Analysis.*—Calcd. for $C_{13}H_{13}FN_2$ (percent): C, 72.19; H, 6.06; N, 12.95. Found (percent): C, 71.92; H, 6.14; N, 12.66.

*(B) 5-fluoro-3-(1-methyl-2-pyrrolidinyl)indole free base*

A mixture of 16 g. of 5-fluoro-3-(1-methyl-2-pyrrolidinylidene)-3H-indole, 8 g. of sodium borohydride, and 300 ml. of absolute ethanol was allowed to stand for 12 hours at 25° C. The solvent was removed under reduced pressure on the steam bath. The residue was treated with 200 ml. of water. The mixture was extracted with 800 ml. of ether. The ether extract was washed with two 200-ml. portions of water and dried over anhydrous magnesium sulfate. The ether solution was evaporated to 250 ml. The evaporation was continued while Skellysolve B was added to keep the volume at 250 ml. until crystals formed. Cooling gave 14.2 g. (88% yield) of pale yellow prisms, M.P. 140–143° C. Recrystallization from acetone-Skellysolve B afforded colorless prisms of 5-fluoro-3-(1-methyl-2-pyrrolidinyl)indole free base, M.P. 142–143.5° C.

Ultraviolet spectrum (ethanol) showed $\lambda_{max.}$ 218 (24,950); sh. 276 (6,500); 285 (6,800); sh. 296 (4,850).

*Analysis.*—Calcd. for $C_{13}H_{15}FN_2$ (percent): C, 71.52; H, 6.93; N, 12.84. Found (percent): C, 71.68; H, 7.02; N, 12.80.

EXAMPLE 37.—5-BENZYLOXY-3-(1-METHYL-2-PYRROLIDINYL)INDOLE FREE BASE

*(A) 5-benzyloxy-3-(1-methyl-2-pyrrolidinylidene)3H-indole*

Phosphorus oxychloride (40.8 g.; 0.26 mole) was added with stirring to 60 ml. (0.6 mole) of 1-methyl-2-pyrrolidone cooled in an ice bath at such a rate (20 minutes) that the temperature of the reaction mixture did not exceed 15° C. The yellow paste was stirred an additional 10 minutes while cooled in the ice bath. To this material was added with stirring a solution of 53.5 g. (0.24 mole) of 5-benzyloxyindole in 150 ml. (1.5 mole) of 1-methyl-2-pyrrolidone at such a rate (45 minutes) that the temperature of the reaction mixture did not exceed 15° C. The resulting thick paste was heated at 90° C. for 2 hours. After cooling somewhat the mixture was dissolved in 750 ml. of water and the warm solution was filtered from a small amount of insoluble solid. The filtrate upon cooling deposited a solid. The mixture was basified by the addition of a solution of 60 g. of sodium hydroxide in 300 ml. of water. The thick paste obtained was diluted with one liter of water and filtered. The solid was washed with 500 ml. of water. The solid was crystallized from aqueous methanol (charcoal), giving 65.4 g. (90% yield) of buff crystals, M.P. 147–150° C. (sint. 142° C.). A portion was recrystallized from acetone-Skellysolve B (charcoal), giving pale yellow needles, M.P. 148–151° C. (sint. 144° C.). Recrystallization from acetone-Skellysolve B afforded pale yellow needles of 5 - benzyloxy - 3 - (1-methyl-2-pyrrolidinylidene)-3H-indole, M.P. 149–152° C. (sint. 147° C.).

Ultraviolet spectrum (ethanol) showed $\lambda_{max.}$ 211 (31,100); 252 (11,750); 257 (13,050); 281 (11,750); 286 (12,050); 336 (15,050).

*Analysis.*—Calcd. for $C_{20}H_{20}N_2O$ (percent): C, 78.90; H, 6.62; N, 9.20. Found (percent): C, 78.06; H, 6.79; N, 9.11.

In the same manner as shown above, 5-(p-methoxybenzyloxy) - 2 - ethyl-3-(1-methyl-2-pyrrolidinylidene)-3H-indole, 5-(p-ethoxybenzyloxy)-3-(1-methyl-2-pyrrolidinylidene) - 3H - indole, 5 - (p-propoxybenzyloxy)-3-(1-methyl-2-pyrrolidinylidene)-3H-indole, and 7-(p-butoxybenzyloxy) - 3-(1 - methyl-2-pyrrolidinylidene)-3H-idole were prepared by substituting 5-(p-methoxybenzyloxy)-2-ethylindole, 5-(p-ethoxybenzyloxy)indole, 5-(p-propoxybenzyloxy-indole, and 7-(p-butoxybenzyloxy)indole, respectively, for 5-benzyloxyindole.

*(B) 5-benzyloxy-3-(1-methyl-2-pyrrolidinyl)indole free base*

A mixture of 15 g. of 5-benzyloxy-3-(1-methyl-2-pyrrolidinylidene)-3H-indole, 150 ml. of ethanol, and 0.2 g. of platinum oxide catalyst was shaken on a Parr apparatus at 50 lbs. initial hydrogen pressure. After 6½ hours one equivalent of hydrogen was absorbed. The catalyst was removed by filtration and the solvent was removed under reduced pressure on the steam bath. The residual brown oil was dissolved in 500 ml. of ether. The ether solution was extracted with two 100-ml. portions of 1 N sodium hydroxide, washed with two 100-ml. portions of water and dried over anhydrous magnesium sulfate (charcoal). Most of the ether was evaporated and 200 ml. of Skellysolve B was added while keeping the solution boiling. Cooling produced 11.7 g. (77.5% yield) of ivory prisms of 5-benzyloxy-3-(1-methyl-2-pyrrolidinyl)indole free base, M.P. 124–126° C.

Ultraviolet spectrum (ethanol) showed $\lambda_{max.}$ sh. 222 (29,500); sh. 260 (4,050); 276 (6,650); 295.5 (5,300); sh. 308 (3,500).

*Analysis.*—Calcd. for $C_{20}H_{22}N_2O$ (percent): C, 78.40; H, 7.24; N, 9.15. Found (percent): C, 78.34; H, 6.97; N, 9.16.

In the same manner as shown above, 5-(p-methoxybenzyloxy) - 2 - ethyl-3-(1-methyl-2-pyrrolidinyl)indole free base, 5-(p - ethoxybenzyloxy)-3-(1-methyl-2-pyrrolidinyl)indole free base, 5 - (p-propoxybenzyloxy) - 3-(1-methyl-2-pyrrolidinyl)indole free base, and 7-(p-butoxybenzyloxy)- 3 -(1-methyl-2-pyrrolidinyl)indole free base were prepared by substituting 5-(p-methoxybenzyloxy)-2-ethyl - 3-(1-methyl-2-pyrrolidinylidene)-3H-indole, 5-(p-ethoxybenzyloxy) - 3-(1-methyl-2-pyrrolidinylidene)-3H-indole, 5 - (p - propoxybenzyloxy)-3-(1-methyl-2-pyrrolidinylidene)-3H-indole, and 7-(p-butoxybenzyloxy)-3-(1-methyl-2-pyrrolidinylidene)-3H-indole, respectively, for 5-benzloxy-3-(1-methyl-2-pyrollidinylidene)-3H-indole.

EXAMPLE 38.—5-HYDROXY-3-(1-METHYL-2-PYROLIDINYL)INDOLE FREE BASE

A mixture of 12.2 g. of 5-benzyloxy-3-(1-methyl-2-pyrrolidinyl)indole free base, 150 ml. of absolute ethanol, and 0.5 g. of 10% palladium-on-charcoal catalyst was shaken on a Parr apparatus at 50 lbs. initial hydrogen pressure. After 4 hours one equivalent of hydrogen was absorbed. The catalyst was removed by filtration and the solvent was removed under reduced pressure on the steam bath. The residual oil was shaken with 300 ml. of ether. The ether solution was decanted from a small amount of tarry material. Crystals soon began forming in the ether solution. The ether was evaporated while being replaced with 100 ml. of acetone. While keeping the solution boiling, 300 ml. of Skellysolve B was added. Cooling produced 5.2 g. (60.5% yield) of buff crystals, M.P. 159–161° C. (sint. 155° C.). Two recrystallizations from acetone-Skellysolve B (once with charcoal treatment) afforded buff crystals of 5-hydroxy-3-(1-methyl-2-pyrrolidinyl)indole free base, M.P. 161–163° C. (sint. 159° C.).

*Analysis.*—Calcd. for $C_{13}H_{16}N_2O$ (percent): C, 72.19; H, 7.46; N, 12.95. Found (percent): C, 72.17; H, 7.63; N, 12.47.

EXAMPLE 39.—6-BENZYLOXY-3-(1-METHYL-2-PYRROLIDINYL)INDOLE FREE BASE (*A*) *6-benzyloxy-3-(1-methyl-2-pyrrolidinylidene) 3-H-indole*

Phosphorus oxychloride (40.8 g.; 0.26 mole) was added with stirring to 50 ml. (0.5 mole) of 1-methyl-2-pyrrolidone cooled in an ice bath at such a rate (25 minutes) that the temperature of the reaction mixture did not exceed 15° C. The yellow paste was stirred an additional 10 minutes while cooled in the ice bath. To this material was added with stirring a solution of 10 g. (0.043 mole) of 6-benzyloxyindole in 50 ml. (0.5 mole) of 1-methyl-2-pyrrolidone during 15 minutes. The temperature did not exceed 10° C. The orange solution was then heated at 80° C. for 2 hours. The green solution was treated with 500 ml. of water, giving an orange solution. The solution was basified with a solution of 60 g. of sodium hydroxide in 300 ml. of water. The solid which separated was collected by filtration and washed with water. Crystallization from aqueous methanol gave 12 g. (88% yield) of buff solid, M.P. 180–184° C. (dec.). Two recrystallizations from aqueous methanol afforded buff crystals of 6-benzyloxy-3-(1-methyl-2-pyrrolidinylidene)-3H-indole, M.P. 180–184° C. (dec.).

Ultraviolet spectrum (ethanol) showed $\lambda_{max}$. 214 (34,900); 244 (13,500); sh. 248 (13,050); 284 (15,500); 348 (13,900).

*Analysis.*—Calcd. for $C_{20}H_{20}N_2O$ (perient): C, 78.90; H, 6.62; N, 9.20. Found (percent): C, 78.23; H, 6.76; N, 8.89.

(*B*) *6-benzyloxy-3-(1-methyl-2-pyrrolidinyl)indole free base*

A mixture of 10.6 g. of 6-benzyloxy-3-(1-methyl-2-pyrrolidinylidene)-3H-indole, 10 g. of sodium borohydride, and 500 ml. of absolute ethanol was allowed to stand for 12 hours at 25° C. The solvent was removed under reduced pressure on the steam zath. The residue was treated with 400 ml. of water. The mixture was extracted with two 400-ml. portions of ether. The combined ether extracts were washed with three 200-ml. portions of water, treated with charcoal, and dried over anhydrous magnesium sulfate. The ether solution was concentrated, Skellysolve B was added, and the solution was concentrated further. Cooling produced 9.1 g. (85% yield) of ivory prisms, M.P. 117.5–118.5° C. (sint. 115° C.). Two recrystallizations from acetone-Skellysolve B afforded ivory prisms of 6-benzyloxy-3-(1-methyl-2-pyrrolidinyl)indole free base, M.P. 118–119° C. (sint. 116° C.).

Ultraviolet spectrum (ethanol) showed $\lambda_{max}$. 222 (40,500); 264 (4,450); 271 (4,650); 292 (5,400).

*Analysis.*—Calcd. for $C_{20}H_{22}N_2O$ (percent): C, 78.40; H, 7.24; N, 9.15. Found (percent): C, 78.07; H, 7.07; N, 9.19.

EXAMPLE 40.—6-HYDROXY-3-(1-METHYL-2-PYRROLIDINYL)INDOLE HYDROCHLORIDE

A solution of 2 g. of 6-benzyloxy-3-(1-methyl-2-pyrrolidinyl)indole free base (Example 39) in 100 ml. of anhydrous ether was treated with ethereal hydrogen chloride. The solid which precipitated was filtered and washed with ether, giving 2.2 g. of colorless 6-benzyloxy-3-(1-methyl-2-pyrrolidinyl)indole hydrochloride, M.P. 105–111° C. (sint. 100° C.). A mixture of 2 g. of the hydrochloride, 0.2 g. of 10% palladium-on-charcoal catalyst, and 50 ml. of absolute ethanol was shaken on a Parr apparatus at 51.5 lbs. initial hydrogen pressure. After 6 hours one equivalent of hydrogen had been absorbed. The catalyst was removed by filtration and the solvent was removed under reduced pressure on the steam bath. The residue was crystallized from methanol-ether, giving a sticky solid. The filtrate was diluted with ether and cooled to give crystals, which after drying weighed 0.22 g. and melted between 193–195° C. (prior sintering). Recrystallization from methanol-isopropanol-ether gave 6-hydroxy-3-(1-methyl-2-pyrrolidinyl)indole hydrochloride as ivory needles, which after drying weighed 0.21 g. and melted between 193–195° C. (sint. 190° C.). An analytical sample was prepared by drying for 12 hours at 120° C. under reduced pressure.

Ultraviolet spectrum (ethanol) showed $\lambda_{max}$. 215 (30.050); sh. 254 (2,750); sh. 262 (3,750); 270 (4,250); 293 (4,650); sh. 302 (3,550).

*Analysis.*—Calcd. for $C_{13}H_{17}ClN_2O$ (percent): C, 61.79; H, 6.78; N, 11.09. Found (percent): C, 61.30; H, 6.77; N, 10.48.

EXAMPLE 41.—7-METHYL-3-(1-BENZYL-2-PYRROLIDINYL)INDOLE FREE BASE (*A*) *7-methyl-3-(1-benzyl-2-pyrrolidinylidene)-3H-indole hemihydrate*

Phosphorus oxychloride (20.4 g.; 0.13 mole) was added with stirring during 25 minutes to 30 g. (0.171 mole) of 1-benzyl-2-pyrrolidone cooled in an ice bath. The temperature remained below 10° C. The orange paste was stirred an additional 10 minutes while cooled in the ice bath. To this material was added with stirring a solution of 15.8 g. (0.12 mole) of 7-methylindole in 40 g. (0.228 mole) of 1-benzyl-2-pyrrolidone during 48 minutes. The temperature did not exceed 20° C. The orange solution was heated at 80° C. for 1 hour. The red solution was poured into 1000 ml. of water, causing an oil to separate. The mixture was heated almost to boiling and then cooled in an ice bath. The solid which separated was collected by filtration and washed with ether. The solid was suspended in 1500 ml. of water and basified by the addition of aqueous sodium hydroxide solution. The solid was collected by filtration, washed with water, and crystallized from aqueous methanol, giving 33.5 g. (97% yield) of yellow needles of 7-methyl-3-(1-benzyl-2-pyrrolidinylidene)-3H-indole hemihydrate, M.P. 172–174° C. (dec.) (sint. 167° C.).

*Analysis.*—Calcd. for $C_{20}H_{20}N_2 \cdot \frac{1}{2}H_2O$ (percent): C, 80.75; H, 7.12; N, 9.42. Found (percent): C, 80.55; H, 7.20; N, 9.91.

(*B*) *7-methyl-3-(1-benzyl-2-pyrrolidinyl)indole free base*

A mixture of 31.4 g. of 7-methyl-3-(1-benzyl-2-pyrrolidinylidene)-3H-indole hemihydrate, 15 g. of sodium borohydride, and 500 ml. of absolute ethanol was allowed to stand for 12 hours at 25° C. The solvent was removed under reduced pressure on the steam bath. The residue was treated with 200 ml. of water. The mixture was extracted with two 400-ml. portions of ether. The ether extracts were washed with three 200-ml. portions of water and dried over anhydrous magnesium sulfate. The ether was evaporated. The residual oil was crystallized twice from ether-Skellysolve B, giving 22.7 g. (74% yield) of ivory prisms, M.P. 95–98° C. Recrystallization from ether-Skellysolve B afforded pale pink prisms of 7-methyl-3-(1-benzyl-2-pyrrolidinyl)indole free base, M.P. 95–98° C.

Ultraviolet spectrum (ethanol) showed $\lambda_{max}$. 220 (42,550); sh. 273 (6,550); 279 (6,650); 289 (5,250).

*Analysis.*—Calcd. for $C_{20}H_{22}N_2$ (percent): C, 82.72;

H, 7.64; N, 9.65. Found (percent): C, 82.44; H, 7.41; N, 9.63.

EXAMPLE 42.—5-BROMO-3-(1-BENZYL-2-PYRROLIDINYL)INDOLE HYDROCHLORIDE (A) *5-bromo-3-(1-benzyl-2-pyrrolidinylidene)-3H-indole*

Phosphorus oxychloride (20.4 g.; 0.13 mole) was added during 30 minutes with stirring to 40 g. (0.228 mole) of 1-benzyl-2-pyrrolidone cooled in an ice bath. The temperature remained below 10° C. The orange paste was stirred an additional 10 minutes while cooled in the ice bath. To this material was added with stirring a solution of 23.6 g. (0.12 mole) of 5-bromoindole in 60 g. (0.342 mole) of 1-benzyl-2-pyrrolidone during 20 minutes. The temperature did not rise above 12° C. The orange solution was heated at 80° C. for 1 hour. The red solution was poured into 1000 ml. of water, causing an oil to separate. The mixture was heated almost to boiling, cooled in an ice bath, and basified by the addition of aqueous sodium hydroxide solution. The orange solid which separated was collected by filtration and washed with water and then ether (about 200 ml.). Crystallization from 500 ml. of methanol gave 25.5 g. (60% yield) of colorless needles, M.P. 202° C. (dec.) (sint. 197° C.). A portion was recrystallized twice from aqueous methanol, affording colorless needles of 5-bromo-3-(1-benzyl-2-pyrrolidinylidene)-3H-indole, M.P. 202° C. (dec.) (sint. 197° C.).

Ultraviolet spectrum (ethanol) showed $\lambda_{max}$ 215 (31,250); sh. 248 (8,900); sh. 252 (9,050); sh. 258 (9,400); 280 (15,250); sh. 286 (13,750); sh. 300 (7,050); 350 (15,250).

*Analysis.*—Calcd. for $C_{19}H_{17}BrN_2$ (percent): C, 64.59; H, 4.85. Found (percent): C, 64.43; H, 4.61.

(B) *5-bromo-3-(1-benzyl-2-pyrrolidinyl)indole hydrochloride*

A mixture of 23.7 g. of 5-bromo-3-(1-benzyl-2-pyrrolidinylidene)-3H-indole, 12 g. of sodium borohydride, and 500 ml. of absolute ethanol was allowed to stand for 12 hours at 25° C. The solvent was removed under reduced pressure on the steam bath. The residue was treated with 200 ml. of water. The mixture was extracted with two 400-ml. portions of ether. The ether extracts were washed with two 200-ml. portions of water and dried over anhydrous magnesium sulfate. The ether solution containing 5 - bromo - 3-(1-benzyl-2-pyrrolidinyl)indole free base was treated with ethereal hydrogen chloride. The solid was collected by filtration and crystallized from ethanol-ether, giving 19.6 g. (74% yield) of colorless prisms of 5-bromo-3-(1-benzyl-2-pyrrolidinyl)indole hydrochloride, M.P. 181–186° C.

Ultraviolet spectrum (ethanol) showed $\lambda_{max}$ 220 (41,600); 279 (5,500); 287 (5,750); 296 (4,250).

*Analysis.*—Calcd. for $C_{19}H_{20}BrClN_2$ (percent): C, 58.25; H, 5.15; N, 7.15. Found (percent): C, 58.55; H, 5.08; N, 6.79.

EXAMPLE 43.—5-CHLORO-3-(1-BENZYL-2-PYRROLIDINYL)INDOLE HYDROCHLORIDE (A) *5-chloro-3-(1-benzyl-2-pyrrolidinylidene)-3H-indole*

Phosphorus oxychloride (20.4 g.; 0.13 mole) was added during 25 minutes with stirring to 30 g. (0.171 mole) of 1-benzyl-2-pyrrolidone cooled in an ice bath. The temperature remained below 10° C. The orange paste was stirred an additional 10 minutes while cooled in the ice bath. To this material was added with stirring a solution of 15.2 g. (0.1 mole) of 5-chloroindole in 28 g. (0.16 mole) of 1-benzyl-2-pyrrolidone during 15 minutes. The temperature did not rise above 10° C. The ice bath was replaced with a warm water bath. The temperature of the reaction mixture began rising rapidly and in 10 minutes reached a maximum of 75° C. The brown solution was then heated at 75° C. for 1 hour. The brown solution was poured into 1000 ml. of water, causing an oil to separate. The mixture was heated almost to boiling, cooled in an ice bath, and extracted with 500 ml. of ether. The aqueous layer, which contained an oil, was basified by the addition of aqueous sodium hydroxide solution. The solid which separated was collected by filtration and washed with water. The solid was mixed was 500 ml. of boiling methanol. Cooling gave 24.6 g. (79% yield) of nearly colorless needles, M.P. 182° C. (dec.) (sint. 178° C.). A portion was recrystallized twice from aqueous methanol, affording colorless needles of 5-chloro-3-(1-benzyl-2-pyrrolidinylidene)-3H-indole, M.P. 190° C. (dec.) (sint. 181° C.).

Ultraviolet spectrum (ethanol) showed $\lambda_{max}$ 214 (29,450); sh. 259 (8,750); 279 (16,200); sh. 286 (14,000); 350 (17,800).

*Analysis.*—Calcd. for $C_{19}H_{17}ClN_2$ (percent): C, 73.90; H, 5.55; Cl, 11.48; N, 9.07. Found (percent): C, 73.60; H, 5.59; Cl, 11.38; N, 8.57.

In the same manner as shown above, 5-chloro-3-[1-(p-methoxybenzyl)-2-pyrrolidinylidene]-3H-indole, 5-chloro-3-[1-(p-ethoxybenzyl)-2-pyrrolidinylidene]-3H-indole, 5-chloro-3-[1-(p-propoxybenzyl)-2-pyrrolidinylidene]-3H-indole, and 5-chloro-3-[1-(p-butoxybenzyl)-2-pyrrolidinylidene]-3H-indole were prepared by substituting 1-(p-methoxybenzyl)-2-pyrrolidone,
1-(p-ethoxybenyl)-2-pyrrolidone,
1-(p-propoxybenzyl(-2-pyrrolidone and
1-(p-butoxybenzyl)-2-pyrrolidone, respectively, for 1-benzyl-2-pyrrolidone.

(B) *5-chloro-3-(1-benzyl-2-pyrrolidinyl)indole hydrochloride*

A mixture of 22.8 g. of 5-chloro-3-(1-benzyl-2-pyrrolidinylidene)-3H-indole, 11 g. of sodium borohydride, and 300 ml. of absolute ethanol was allowed to stand for 12 hours at 25° C. The solvent was removed under reduced pressure on the steam bath. The residue was treated with 200 ml. of water. The mixture was extracted with two 400-ml. portions of ether. The ether extracts were washed with two 200-ml. portions of water and dried over anhydrous magnesium sulfate. The ether was evaporated. The residual oil, 5-chloro-3-(1-benzyl-2-pyrrolidinyl)indole free base, was dissolved in 400 ml. of anhydrous ether and treated with ethereal hydrogen chloride. The solid was collected by filtration and crystallized from ethanol-ether, giving 19.4 g. (76% yield) of colorless prisms of 5-chloro-3-(1-benzyl-2-pyrrolidinyl)indole hydrochloride, M.P. 174–176° C. (sint. 170° C.).

Ultraviolet spectrum (ethanol) showed $\lambda_{max}$ 226 (37,850); sh. 268 (4,950); 278 (5,650); 286 (5,800); 296 (4,300).

*Analysis.*—Calcd. for $C_{19}H_{20}Cl_2N_2$ (percent): C, 65.70; H, 5.81; Cl, 20.42; N, 8.07. Found (percent): C, 65.44; N, 5.90; Cl, 20.42; N, 7.91.

In the same manner as shown above, 5-chloro-3-[1-(p-methoxy) - 2 - pyrrolidinyl]indole hydrochloride, 5-chloro - 3 - [1 - (p - ethoxybenzyl) - 2 - pyrrolidinyl]indole hydrochloride, 5 - chloro - 3 - [1 - (p - propoxybenzyl)- 2 - pyrrolidinyl]indole hydrochloride, and 5 - chloro-3-[1 - (p - butoxybenzyl) - 2 - pyrrolidinyl]indole hydrochloride were prepared by substituting 5-chloro-3-[1-(p-methoxybenzyl) - 2 - pyrrolidinylidene] - 3H - indole, 5-chloro - 3 - [1 - (p - ethoxybenzyl) - 2 - pyrrolidinylidene] - 3H - indole, 5 - chloro - 3 - [1 - (p - propoxybenzyl) - 2 - pyrrolidinylidene] - 3H - indole, and 5-chloro - 3 - [1 - (p - butoxybenzyl) - 2-pyrrolidinylidene]-3H-indole, respectively, for 5-chloro-3-(1-benzyl-2-pyrrolidinylidene)-3H-indole.

EXAMPLE 44.—3-(1-METHYL-2-PYRROLIDINYL) INDOLE N-OXIDE

A solution of 7.0 g. (0.035 mole) of 3-(1-methyl-3-pyrrolidinyl)indole free base, 4.7 ml. (0.04 mole) of 29% hydrogen peroxide, and 50 ml. of methanol was allowed to stand at 25° C. for three days. The solution was shaken with platinum oxide catalyst for two hours and filtered. The solution was taken to dryness under reduced pressure to yield a non-crystalline residue. The residue was extracted with hot Skellysolve B and decanted from colored material. The solution was refrigerated for 12 hours and decanted. The residue was twice dissolved in ethyl acetate, treated with decolorizing charcoal, and filtered. The filtrate was diluted with Skellysolve B until a gum precipitated. The solvent was decanted and the residue was dried at 3 mm. pressure to yield 1.7 g. of 3-(1-methyl-2-pyrrolidinyl) indole N-oxide.

Ultraviolet spectrum (ethanol) showed $\lambda_{max}$. 217.5 (37,300); 272 (5,930); sh. 277.5 (6,080); 280 (6,100); 288 (5,370).

Analysis.—Calcd. for $C_{13}H_{16}N_2O$ (percent): C, 72.19; H, 7.46; N, 12.95. Found (percent): C, 72.16; H, 7.76; N, 12.77.

EXAMPLE 45.—2-METHYL-3-(1-METHYL-2-PYRROLIDINYL)INDOLE FREE BASE (A) *2-methyl-3-(1-methyl-2-pyrrolidinylidene)-3H-indole hydrate*

Phosphorus oxychloride (81.6 g.; 0.52 mole) was added with stirring to 100 ml. (1.0 mole) of 1-methyl-2-pyrrolidone cooled in an ice bath at such a rate (50 minutes) that the temperature of the reaction did not exceed 15° C. The thick yellow paste was stirred an additional 20 minutes while cooled in the ice bath. To this material was added with stirring during 105 minutes a solution of 63 g. (0.48 mole) of 2-methylindole in 100 ml. (0.1 mole) of 1-methyl-2-pyrrolidone. The temperature did not rise above 18° C. The ice bath was removed from the viscous brown liquid and in 20 minutes the temperature rose to 30° C. The mixture was heated at 80° C. for 2 hours. After cooling the viscous brown liquid was dissolved in 1500 ml. of water. A solution of 120 g. of sodium hydroxide in 600 ml. of water was added. The resulting paste was diluted with 800 ml. of water and filtered. The solid was washed with 900 ml. of water and dissolved in 1000 ml. of ethanol. The volume was reduced to 500 ml. and 750 ml. of water was added while keeping the solution boiling. The solid obtained on cooling was recrystallized from aqueous methanol, giving 108 g. (96% yield) of green needles, M.P. 123–125° C. (dec.) (sint. 113° C.). A portion of this material was recrystallized once from aqueous methanol (charcoal) and then twice from aqueous methanol. The needles thus obtained were washed with methanol which removed most of the colored material, giving buff needles of 2-methyl-3-(1-methyl-2-pyrrolidinylidene) - 3H - indole hydrate, M.P. 123–125° C. (dec.) (sint. 120° C.).

Analysis.—Calcd. for $C_{14}H_{16}N_2 \cdot H_2O$ (percent): C, 73.01; H, 7.88; N, 12.17. Found (percent): C, 72.40; H, 7.72; N, 12.17.

In the same manner as shown above, 5-benzyloxy-2-ethyl - 3 - (1 - methyl - 2 - pyrrolidinylidene) - 3H-indole hydrate, 2 - propyl - 3 - (1 - methyl - 2 - pyrrolidinylidene) - 3H - indole hydrate, and 2 - butyl - 3 - (1 - methyl-2-pyrrolidinylidene)-3H-indole hydrate were prepared by substituting 5 - benzyloxy - 2 - ethylindole, 2 - propylindole, and 2-butylindole, respectively, for 2-methylindole.

(B) *2-methyl-3-(1-methyl-2-pyrrolidinyl)indole free base*

A mixture of 20 g. of 2-methyl-3-(1-methyl-2-pyrrolidinylidene)-3H-indole hydrate, 150 ml. of methanol, and 0.5 g. of 5% palladium-on-charcoal catalyst was shaken on a Parr apparatus at 50 lbs. initial hydrogen pressure. After 48 hours one equivalent of hydrogen was absorbed. The mixture was filtered and the filter cake was washed with 50 ml. of methanol. The methanol was removed under reduced pressure on the steam bath. The residue was treated with 800 ml. of ether, slurried with charcoal and diatomaceous earth, and filtered. The filtrate was reduced to 200 ml. on the steam bath which caused a solid to separate. Skellysolve B (100 ml.) was added. Filtration yielded 2.3 g. of unchanged starting material. The filtrate was evaporated to dryness. The residue was crystallized from Skellysolve B, giving 11 g. (59% yield) of yellow-brown solid, M.P. 120–122° C. (sint. 116° C.). Recrystallization from Skellysolve B (charcoal) and then from ether-Skellysolve B gave yellow prisms of 2-methyl-3-(1-methyl-2-pyrrolidinyl)indole free base, M.P. 122–124° C.

Ultraviolet spectrum (ethanol) showed $\lambda_{max}$. 221 (35,500); sh. 275 (6,700); 281 (7,000); 288 (5,900).

Analysis.—Calcd. for $C_{14}H_{18}N_2$ (percent): C, 78.46; H, 8.46; N, 13.08. Found (percent): C, 78.80; H, 8.30; N, 12.97.

In the same manner as shown above, 5-benzyloxy-2-ethyl - 3 - (1 - methyl - 2 - pyrrolidinyl)indole free base, 2 - propyl - 3 - (1 - methyl - 2 - pyrrolidinyl)indole free base, and 2 - butyl - 3 - (1 - methyl - 2 - pyrrolidinyl)indole free base were prepared by substituting 5-benzyloxy-2 - ethyl - 3 - (1 - methyl - 2 - pyrrolidinylidene) - 3H-indole hydrate, 2 - propyl - 3 - (1 - methyl - 2 - pyrrolidinylidene) - 3H - indole hydrate, and 2 - butyl - 3-(1-methyl - 2 - pyrrolidinylidene) - 3H - indole hydrate, respectively, for 2 - methyl - 3 - (1 - methyl - 2 - pyrrolidinylidene)-3H-indole hydrate.

EXAMPLE 46.—3-(1-PROPYL-5,5-DIMETHYL-2-PYRROLIDINYL)INDOLE FREE BASE (A) *3-(5,5-dimethyl-2-pyrrolidinylidene)-3H-indole hydroiodide*

A solution of 3-(5,5-dimethyl-1-pyrrolin-2-yl)indole (Example 22, Part B) (2.1 g.; 0.01 mole) in 25 ml. of methanol and 5 ml. of methyl iodide was refluxed for 4 hr. The resulting suspension was evaporated to dryness and the residue was crystallized from ethanol to give 1.56 g. (46% yield) of 3-(5,5-dimethyl-2-pyrrolidinylidene)-3H-indole hydroiodide; M.P. 280° C. (dec.), raised to 289° C. (dec.) on recrystallization.

Analysis.—Calcd. for $C_{14}H_{17}IN_2$ (percent): C, 49.42; H, 5.04; I, 37.30; N, 8.24. Found (percent): C, 49.65; H, 4.90; I, 36.78; N, 7.99.

(B) *3-(5,5-dimethyl-2-pyrrolidinyl)indole hydrochloride*

Sodium borohydride (1.3 g.) was added to a solution of 3-(5,5-dimethyl-2-pyrrolidinylidene) - 3H - indole hydroiodide (1.26 g.; 3.7 millimoles) in 100 ml. of ethanol. The mixture was stirred for 4 hr. and allowed to stand for 72 hours. It was evaporated to dryness in vacuo. 50 ml. of water was added, and extraction was performed with ether. The extract was washed with saturated salt solution and evaporated to give 0.8 g. of an oil, 3-(5,5-dimethyl-2-pyrrolidinyl)indole free base. A solution of this oil in ether was converted to the hydrochloride with ethereal hydrogen chloride and the resulting solid was crystallized from methanol-ether to give 0.5 g. of 3-(5,5-dimethyl - 2 - pyrrolidinyl)indole hydrochloride (54% yield), M.P. 230–231° C.

(C) *3-(1-propyl-5,5-dimethyl-2-pyrrolidinyl)indole free base*

The 3-(5,5-dimethyl-2-pyrrolidinyl)indole hydrochloride (Part B) was dissolved in 10 ml. of water and the solution was basified with 15% aqueous sodium hydroxide solution and extracted with ether. The extract was washed with saturated salt solution, dried over anhydrous sodium sulfate, and evaporated to give 3-(5,5-dimethyl-2-pyrrolidinyl)indole free base. In the same manner as shown in Example 22, Parts D and E, 3-(1-propyl-5,5-dimethyl-2-pyrrolidinyl)indole free base was prepared by substituting propionic anhydride for acetic anhydride.

EXAMPLE 47.—7-ETHOXY-3-(1,4-DIPROPYL-2-PYRROLIDINYL)INDOLE FREE BASE

In the same manner as shown in Example 32, 7-ethoxy-3-(1,4-dipropyl-2-pyrrolidinyl)indole free base was prepared by substituting 7-ethoxyindole and 1,4-dipropyl-2-pyrrolidone for 5-methoxyindole and 1-methyl-2-pyrrolidone to produce 7-ethoxy-3-(1,4-dipropyl-2-pyrrolidinylidene)-3H-indole and reducing the latter with lithium aluminum hydride.

The 3-(2-pyrrolidinyl)indoles of the present invention are orally and parenterally active in birds, animals, mammals and humans for the treatment of neuroses, such as anxiety, tension, apprehension, or agitation, and for treatment of psychotic conditions, e.g., in schizophrenia.

In the classical avoidance test, the compounds of the present invention demonstrated the ability to relieve experimentally-induced anxiety. The method of Verhave et al., Arch. Int. Pharmacodyn. 116, 45, 1958, was employed. Rat data are shown in Table I and a comparison is made to prior art compounds.

TABLE I

Rating Index:
++ =above 90
− =0–30

| Compound | Rating |
|---|---|
| 3-(1-methyl-2-pyrrolidinyl)indole free base | ++ |
| 7-methyl-3-(1-methyl-2-pyrrolidinyl)indole free base | ++ |
| 3-(1,5-dimethyl-2-pyrrolidinyl)indole free base | ++ |
| 4-chloro-3-(1-methyl-2-pyrrolidinyl)indole free base | ++ |
| Chlorpromazine | ++ |
| 3-(2-pyrrolidinyl)indole—Fulhage et al., J. Amer. Chem. Soc. 80, 6254, 1958 | − |
| 3-(2-pyrrolidinyl)indole—South African Patent 3,525/62 | − |
| 3-(1-methyl-2-piperidyl)indole free base—Akerman et al., Rec. Trav. Chim. 73, 629, 1954 | − |

In the fighting-mouse test, the 3-(2-pyrrolidinyl)indoles of the present invention demonstrated the ability to minimize aggressive behavior in mice in which an aggressive behavior had been induced as a result of isolation stress. The method of Yen et al., Pharmacologist 4, 173, 1962, was employed. Groups of six mice were injected with a maximum of 50 mg./kg. Tests were carried out sixty minutes after administration and doses were decreased in 0.3 log intervals. The $ED_{50}$ is the drug dosage which prevented 50 percent of the animals from continuing their aggressive behavior (Table II).

TABLE II

| Compound | $ED_{50}$ (mg./kg.) |
|---|---|
| 7-methyl-3-(1-methyl-2-pyrrolidinyl)indole free base | 8 |
| 1-methyl-3-(1-methyl-2-pyrrolidinyl)indole free base | 9 |
| 4-chloro-3-(1-methyl-2-pyrrolidinyl)indole free base | 9 |
| 5-fluoro-3-(1-methyl-2-pyrrolidinyl)indole free base | 9 |
| 3-(1-ethyl-2-pyrrolidinyl)indole hydrochloride | 11 |
| 5-chloro-3-(1-methyl-2-pyrrolidinyl)indole free base | 11 |
| 2-methyl-3-(1-methyl-2-pyrrolidinyl)indole free base | 11 |

The 3-(2-pyrrolidinyl)indoles, 3-(1-pyrrolin-2-yl)indoles, and 3-(2-pyrrolidinylidene)-3H-indoles of the present invention have also demonstrated pseudocholinesterase inhibitory activity which is a valuable tool in producing selective stimulation and lucid intervals in confused mental states. Inhibition of this enzyme is determined manometrically using human serum as the enzyme source and acetylcholine chloride ($10^{-1}$ molar) as the substrate. The $I_{50}$ (Table III) is that concentration of test compound which produces 50% inhibition of the enzyme. Compounds producing less than 50% inhibition at a $10^{-3}$ molar concentration of the test compound are considered inactive.

TABLE III

| Compound | $I_{50}$ |
|---|---|
| 3-(1,5,5-trimethyl-2-pyrrolidinyl)indole free base | $8 \times 10^{-5}$ M |
| 3-(1-ethyl-5,5-dimethyl-2-pyrrolidinyl)indole free base | $3 \times 10^{-6}$ M |
| 3-(1-methyl-5-ethyl-2-pyrrolidinyl)indole free base | $1 \times 10^{-5}$ M |
| 5-hydroxy-3-(1-methyl-2-pyrrolidinyl)indole free base | $3 \times 10^{-5}$ M |
| 3-(1-benzyl-2-pyrrolidinyl)indole free base | $6 \times 10^{-5}$ M |
| 5-benzyloxy-3-(1-methyl-2-pyrrolidinyl)indole free base | $6 \times 10^{-5}$ M |
| 3-(1-pyrrolin-2-yl)indole | $4 \times 10^{-6}$ M |
| 3-(1-methyl-2-pyrrolidinylidene)-3H-indole hydroiodide | $5 \times 10^{-6}$ M |
| 3-(1,5-dimethyl-2-pyrrolidinylidene)-3H-indole hydroiodide | $2 \times 10^{-5}$ M |

The novel 3-(2-pyrrolidinyl)indoles, 3-(1-pyrrolin-2-yl)indoles, and 3-(2-pyrrolidinylidene)-3H-indoles of the present invention are also useful antianaphylactic agents and antiinflammatory agents. For example, utilizing the foot paw edema test, 7-methyl-3-(1-methyl-2-pyrrolidinyl)indole free base, 3-(1,3-dimethyl-2-pyrrolidinyl)indole hydrochloride and 3-(1-pyrrolin-2-yl)indole are 2.8, 2.1, and 1.0, respectively, as active as phenylbutazone.

The novel 3-(2-pyrrolidinyl)indoles of the present invention are also useful as anorexigenic agents.

For the purposes noted above, compositions are prepared in solid and liquid unit dosage forms, such as tablets, capsules, powders, granules, syrups, elixirs, and the like, containing suitable quantities of the compounds of the present invention.

Powders are prepared by comminuting the active ingredient to a suitable fine size and mixing with a similarly comminuted diluent. The diluent can be an edible carbohydrate material such as starch. Advantageously, a sweetening agent is present as well as a flavoring agent. Dry granulations for reconstitution with water are prepared utilizing water-soluble diluents. A powder mixture of finely divided active ingredient and a water-soluble diluent such as sucrose, glucose, and the like is wetted with a binder such as acacia mucilage or gelatin solution and forced through a screen to form granules which are allowed to dry. Advantageously, a thickening or suspending agent such as methylcellulose is present as well as a wetting agent and flavoring agent.

Capsules are produced by preparing a powder mixture as hereinbefore described and filling into formed gelatin sheets. Advantageously, as an adjuvant to the filling operation, a lubricant such as talc, magnesium stearate, and calcium stearate is added to the powder mixture before the filling operation.

Tablets are made by preparing a powder mixture, granulating or slugging, adding a lubricant and pressing into tablets. The powder mixture is prepared by mixing the active ingredient suitably comminuted, with a diluent or base such as starch, lactose, kaolin, dicalcium phosphate, and the like. The powder mixture can be granulated by wetting with a binder such as corn syrup, gelatin solution, methylcellulose solution, or acacia mucilage and forcing through a screen. As an alternative to granulating, the powder mixture can be slugged, i.e., run through a tablet machine and the resulting imperfectly-formed tablets broken into pieces (slugs). The slugs can be lubricated to prevent sticking to the tablet-forming dies by means of the addition of stearic acid, a stearate salt, talc, or mineral oil. The lubricated mixture is then compressed into tablets.

Advantageously, the tablet can be provided with a protective coating consisting of a sealing coat of shellac, a coating of sugar and methylcellulose, and a polish coating of carnauba wax.

Oral fluids are prepared in unit dosage forms such as syrups and elixirs wherein each teaspoonful of composition contains a predetermined amount of active ingredient for administration.

A syrup is prepared by dispersing the active ingredient in a suitably-flavored aqueous sucrose solution. Similarly an elixir is prepared utilizing a hydro-alcoholic vehicle. Elixirs are advantageous vehicles for use when another therapeutic agent, which is not sufficiently water-soluble, is to be included in the composition.

For parenteral administration aqueous fluid unit dosage forms can be prepared. In preparing the parenteral form, a measured amount of active ingredient is placed in a vial, and the vial and its contents are sterilized and sealed. An accompanying vial of sterile water is provided as a vehicle to form a suspension prior to administration. Advantageously, the sterile water can have dissolved therein a local anesthetic and a buffering agent. Parenteral aqueous solutions can be made by preparing a suitable pharmaceutically-acceptable salt of the active ingredient such as the acetate, citrate, tartrate, maleate, lactate, and the like.

Alternatively, a parenteral suspension can be prepared by suspending the active ingredient in a parenterally-acceptable vegetable oil with or without additional adjuvants, and sterilizing after filling into vials.

For veterinary oral use the active ingredient is conveniently prepared in the form of a food premix. The food premix can comprise the active ingredient in admixture with an edible pharmaceutical diluent of the type previously mentioned such as starch, oatmeal, flour, calcium carbonate, talc, dried fish meal, and the like. The prepared premix is then conveniently added to the regular feed, thereby providing medication to the animal in the course of feeding.

The term "unit dosage form" as used in the specification and claims refers to physically discrete units suitable as unitary dosages for human subjects and animals, each unit containing a predetermined quantity of active material calculated to produce the desired therapeutic effect in association with the required pharmaceutical diluent, carrier or vehicle. The specifications for the novel unit dosage forms of this invention are dictated by and directly dependent on (a) the unique characteristics of the active material and the particular therapeutic effect to be achieved, and (b) the limitations inherent in the art of compounding such active material for therapeutic use in humans and animals, as disclosed in detail in this specification, these being features of the present invention. Examples of suitable unit dosage forms in accord with this invention are tablets, capsules, pills, troches, powder packets, granules, wafers, cachets, segregated multiples of any of the foregoing, and other forms as herein described.

In addition to the administration of a compound of this invention as the principal active ingredient of compositions for the treatment of the conditions noted above, the said compound can be included with other types of compounds to obtain advantageous combinations of properties. Such combinations can include the compounds of this invention in combination with analgetic agents such as codeine, aspirin, acetophenetidin, salicylamide and N-acetyl-p-aminophenol; hypnotic agents such as the barbiturates and chloral hydrate; steroids such as hydrocortisone, prednisolone, fluprednisolone, and methylprednisolone; and muscle relaxants such as chlorzoxazone, carisoprodol, mephenesin, meprobamate, phenaglycodol, and zoxazolamine; and antihistamines such as chlorpheniramine maleate, prophenpyridamine maleate, and pyrilamine.

The amount of active ingredient that is to be administered depends on the age, weight of the patient, the particular condition to be treated, the frequency of administration, and the route of administration. The dose range is from about 0.15 to about 15 mg. per kg. of body weight or a total dose for humans of from about 10 to about 1000 mg. given as a single dose, with the preferred range from about 25 to 500 mg.

Veterinary dosages will correspond to human dosages with amounts administered being in proportion to the weight of the animal as compared to adult humans.

The active ingredient is compounded with a suitable pharmaceutical diluent in unit dosage form. For convenient and effective administration in a preferred embodiment of this invention, a unit dosage form containing the active ingredient in an amount of from about 25 mg. to about 500 mg. is administered. The dosage of compositions containing the active ingredient and one or more active ingredients is to be determined with reference to the usal dosage of each such ingredient.

The following compositions are illustrative of the compositions of the present invention:

(1) *Tablets*

10,000 scored tablets for oral use, each containing 500 mg. of 3-(1-methyl-2-pyrrolidinyl)indole free base, are prepared from the following ingredients:

| | Grams |
|---|---|
| 3-(1-methyl-2-pyrrolidinyl)indole free base | 5000 |
| Starch, U.S.P. | 350 |
| Talc, U.S.P. | 250 |
| Calcium stearate | 35 |

The powdered 3-(1-methyl-2-pyrrolidinyl)indole free base is granulated with a 4% w/v aqueous solution of methylcellulose U.S.P. (1500 cps.). To the dried granules is added a mixture of the remainder of the ingredients and the final mixture compressed into tablets of proper weight. Satisfactory clinical response is obtained in adults showing mental and emotional disturbances, marked by anxiety, tension, apprehension or agitation with 1 or 2 tablets which can be repeated in 4 hours, if necessary. For moderate conditions a half tablet 3 times a day is used.

(2) *Capsules*

10,000 two-piece hard gelatin capsules for oral use, each containing 250 mg. of 3-(1-methyl-2-pyrrolidinyl) indole free base, are prepared from the following ingredients:

| | Grams |
|---|---|
| 3-(1-methyl-2-pyrrolidinyl)indole free base | 2500 |
| Lactose, U.S.P. | 1000 |
| Starch, U.S.P. | 300 |
| Talc, U.S.P. | 65 |
| Calcium stearate | 25 |

The powdered 3-(1-methyl-2-pyrrolidinyl)indole free base is mixed with the starch-lactose mixture followed by the talc and calcium stearate. The final mixture is then encapsulated in the usual manner. One capsule is used every 3 hours to control anxiety and apprehension.

Capsules containing 10, 25, 50, and 100 mg. of 3-(1-methyl-2-pyrrolidinyl)indole free base are also prepared by substituting 100, 250, 500 and 1000 gm. for 2500 gm. in the above formulation.

(3) *Soft elastic capsules*

One-piece soft elastic capsules for oral use, each containing 200 mg. of 3-(1-methyl-2-pyrrolidinyl)indole free base, are prepared in the usual manner by first dispersing the powdered active material in sufficient corn oil to render the material capsulatable.

(4) Aqueous suspension

An aqueous suspension for oral use containing in each 5 ml., 1 gram of 3-(1-ethyl-5,5-dimethyl-2-pyrrolidinyl) indole free base, is prepared from the following ingredients:

3-(1-ethyl-5,5-dimethyl-2-pyrrolidinyl)indole free base—2000 gm.
Methylparaben, U.S.P.—7.5 gm.
Propylparaben, U.S.P.—2.5 gm.
Saccharin sodium—12.5 gm.
Cyclamate sodium—2.5 gm.
Glycerin—3000 ml.
Tragacanth powder—10 gm.
Orange oil flavor—10 gm.
F. D. and C. Orange Dye—7.5 gm.
Deionized water, q.s. to 10,000 ml.

(5) Parenteral solution

A sterile aqueous solution suitable for intramuscular or intravenous use and containing 100 mg. of 3-(1,5,5-trimethyl-2-pyrrolidinyl)indole free base in each 2 milliliters is prepared from the following ingredients:

3 - (1,5,5 - trimethyl-2-pyrrolidinyl)indole free base—100 gm.
Sodium metabisulfite—1 gm.
Polyethylene glycol 300—500 ml.
Water for injection, q.s. to 1000 ml.

(6) Parenteral suspension

A sterile aqueous suspension suitable for intramuscular injection and containing in each milliliter 250 mg. of 1-methyl-3-(1-methyl-2-pyrrolidinyl)indole free base is prepared from the following ingredients:

Polyethylene glycol 4000, U.S.P.—3 gm.
Sodium chloride—0.9 gm.
Polysorbate 80, U.S.P.—0.4 gm.
Sodium metabisulfite—0.1 gm.
Methylparaben, U.S.P.—0.18 gm.
Propylparaben, U.S.P.—0.02 gm.
1-methyl-3-(1-methyl-2-pyrrolidinyl)indole free base (micronized)—25 gm.
Water for injection, q.s. to 100 ml.

In addition, the novel compounds of the present invention exhibit high absorption of radiation in the wave length of 280–300 millimicrons and, accordingly, can be employed as an effective sun screen when incorporated in suitable vehicles such as transparent film-forming compositions and oils.

What is claimed is:

1. A compound selected from the group consisting of (1) 3-(2-pyrrolidinylidene)-3H-indole free bases having the formula:

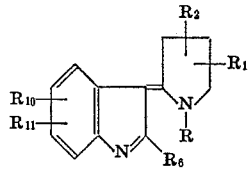

wherein R is selected from the group consisting of alkyl of 1 to 4 carbon atoms, inclusive, benzyl, and p-alkoxybenzyl of 8 to 11 carbon atoms, inclusive; $R_1$, $R_2$ and $R_6$ are selected from the group consisting of hydrogen and alkyl of 1 to 4 carbon atoms, inclusive; and $R_{10}$ and $R_{11}$ are selected from the group consisting of hydrogen, alkyl of 1 to 4 carbon atoms, inclusive, halogen, alkoxy of 1 to 4 carbon atoms, inclusive, benzyloxy, p-alkoxybenzyloxy of 8 to 11 carbon atoms, inclusive, nitro, and amino, (2) physiologically tolerable acid addition salts, and (3) physiologically tolerable quaternary ammonium salts thereof.

2. A compound of the formula

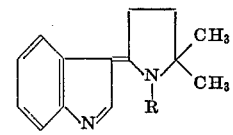

wherein R is alkyl of 1 to 4 carbon atoms, inclusive, according to claim 1.

3. 3 - (1 - methyl - 2 - pyrrolidinylidene)-3H-indole hydroiodide according to claim 1.

4. 3 - (1,5 - dimethyl-2-pyrrolidinylidene)-3H-indole hydroiodide according to claim 1.

5. 7 - methyl - 3 - (1-methyl-2-pyrrolidinylidene)-3H-indole according to claim 1.

6. 3 - (1 - methyl - 2-pyrrolidinylidene)-3H-indole methiodide according to claim 1.

References Cited

UNITED STATES PATENTS 3,214,438   10/1965   Youngdale _____ 260—326.15

ALEX MAZEL, Primary Examiner

J. A. NARCAVAGE, Assistant Examiner